United States Patent

Tanaka et al.

[11] Patent Number: 6,011,636
[45] Date of Patent: Jan. 4, 2000

[54] METHOD OF CONTROLLING EXPOSURE IN FILM SCANNER

[75] Inventors: Hiroshi Tanaka; Atsushi Ito, both of Asaka, Japan

[73] Assignee: Fuji Photo Film Co., Ltd., Kanagawa, Japan

[21] Appl. No.: 08/729,414

[22] Filed: Oct. 11, 1996

[30] Foreign Application Priority Data

Oct. 13, 1995 [JP] Japan ................................. 7-265357

[51] Int. Cl.$^7$ ........................................................ G03F 3/10
[52] U.S. Cl. ........................................................... 358/527
[58] Field of Search .................................... 396/213, 310, 396/564; 358/487, 501, 527; 348/96, 97

[56] References Cited

U.S. PATENT DOCUMENTS

| | | | |
|---|---|---|---|
| 5,337,164 | 8/1994 | Yabe et al. ............................... | 358/487 |
| 5,706,050 | 1/1998 | Nishimura et al. ....................... | 348/97 |
| 5,729,284 | 3/1998 | Ishii et al. ................................ | 348/96 |
| 5,767,983 | 6/1998 | Terashita ................................. | 358/302 |
| 5,790,707 | 8/1998 | Tanaka et al. ........................... | 382/274 |

FOREIGN PATENT DOCUMENTS

| | | | |
|---|---|---|---|
| 575922 | 3/1991 | Japan ............................. | H04N 5/253 |
| 6-101189 | 5/1994 | Japan ............................. | H04N 1/04 |
| 90 04301 | 4/1990 | WIPO ............................ | H04N 1/387 |

*Primary Examiner*—Leo H. Boudreau
*Assistant Examiner*—Shawn B. Cage

[57] ABSTRACT

A line sensor captures, under predetermined and initialized exposure, at least one of the first negative base area before the first laboratory reserved area, the second negative base area just behind the first laboratory reserved area, the third negative base area just before the second reserved area, and the fourth negative base area behind the second reserved area, and then R, G and B output voltages output from the line sensor are measured. Next, the gain of each of analog amplifiers, or the gain of each of the analog amplifiers and the exposure time of the line sensor are controlled such that each maximum value of the measured R, G and B output voltages corresponds to a predetermined reference voltage. An image of each frame is captured based on the exposure control. Thus, the exposure can be controlled correctly, and a frame image can be captured properly.

37 Claims, 16 Drawing Sheets

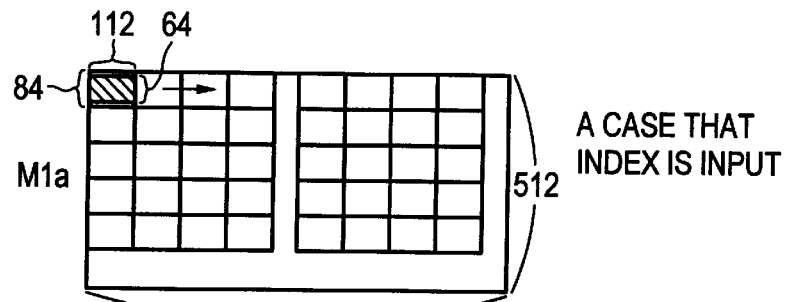
F I G. 9(A)  A CASE THAT INDEX IS INPUT
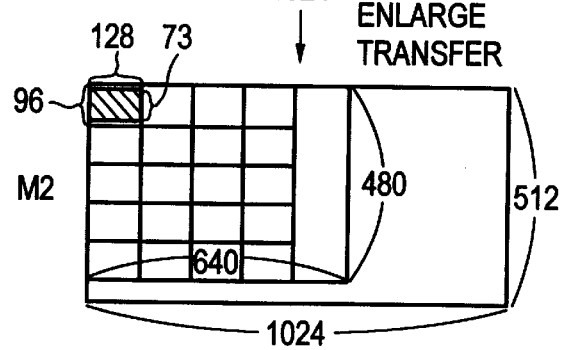
F I G. 9(B)
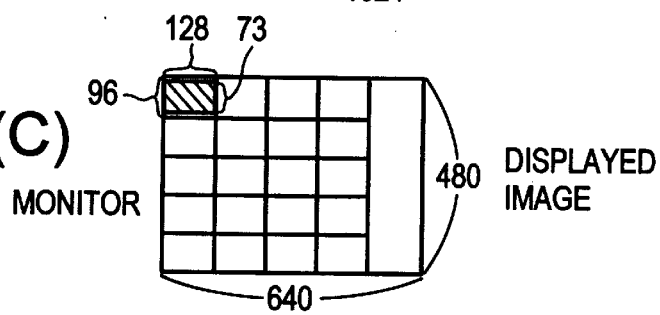
F I G. 9(C)  DISPLAYED IMAGE
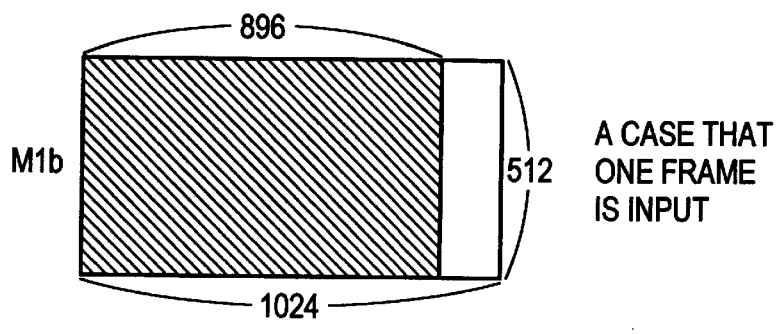
F I G. 9(D)  A CASE THAT ONE FRAME IS INPUT

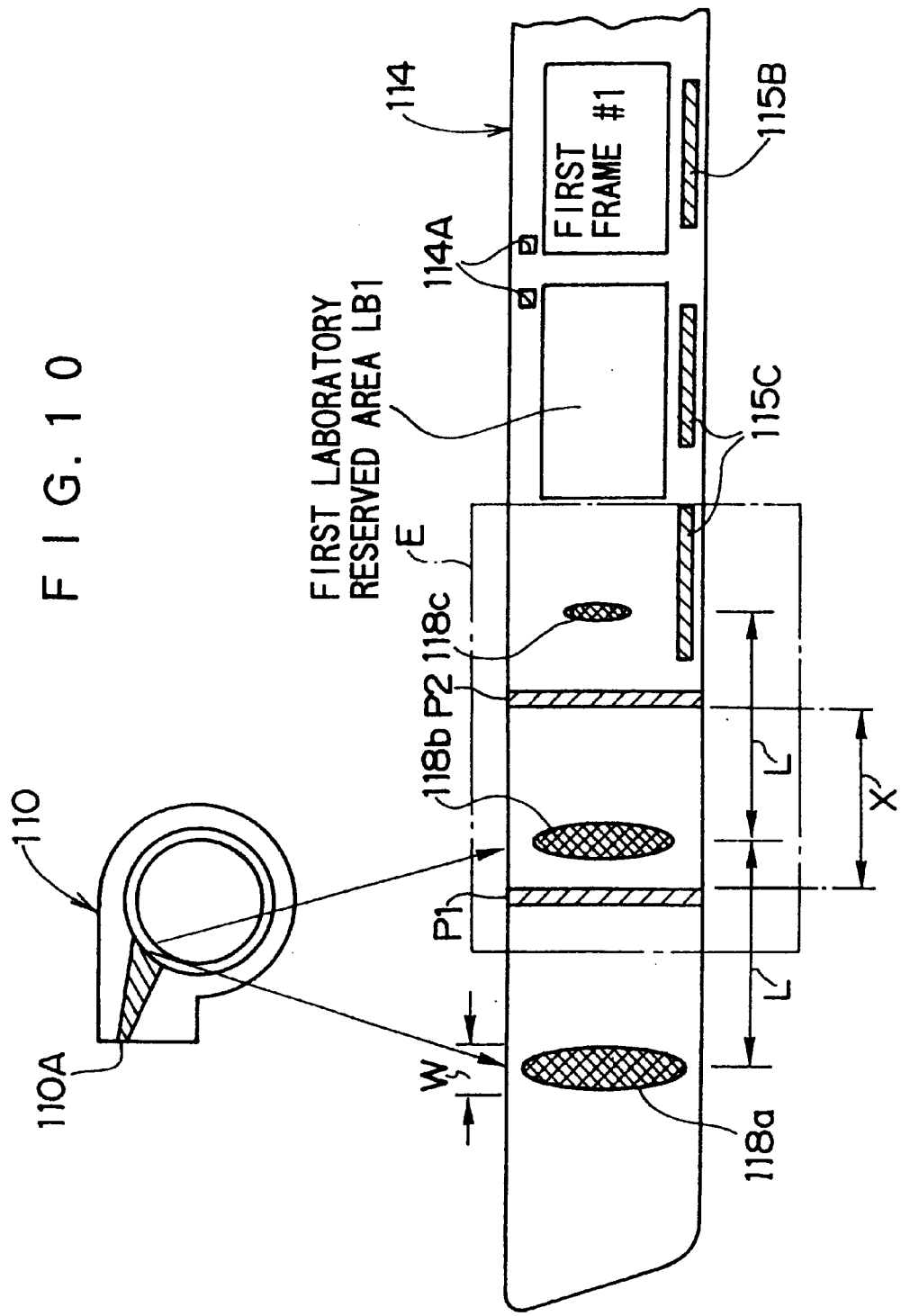

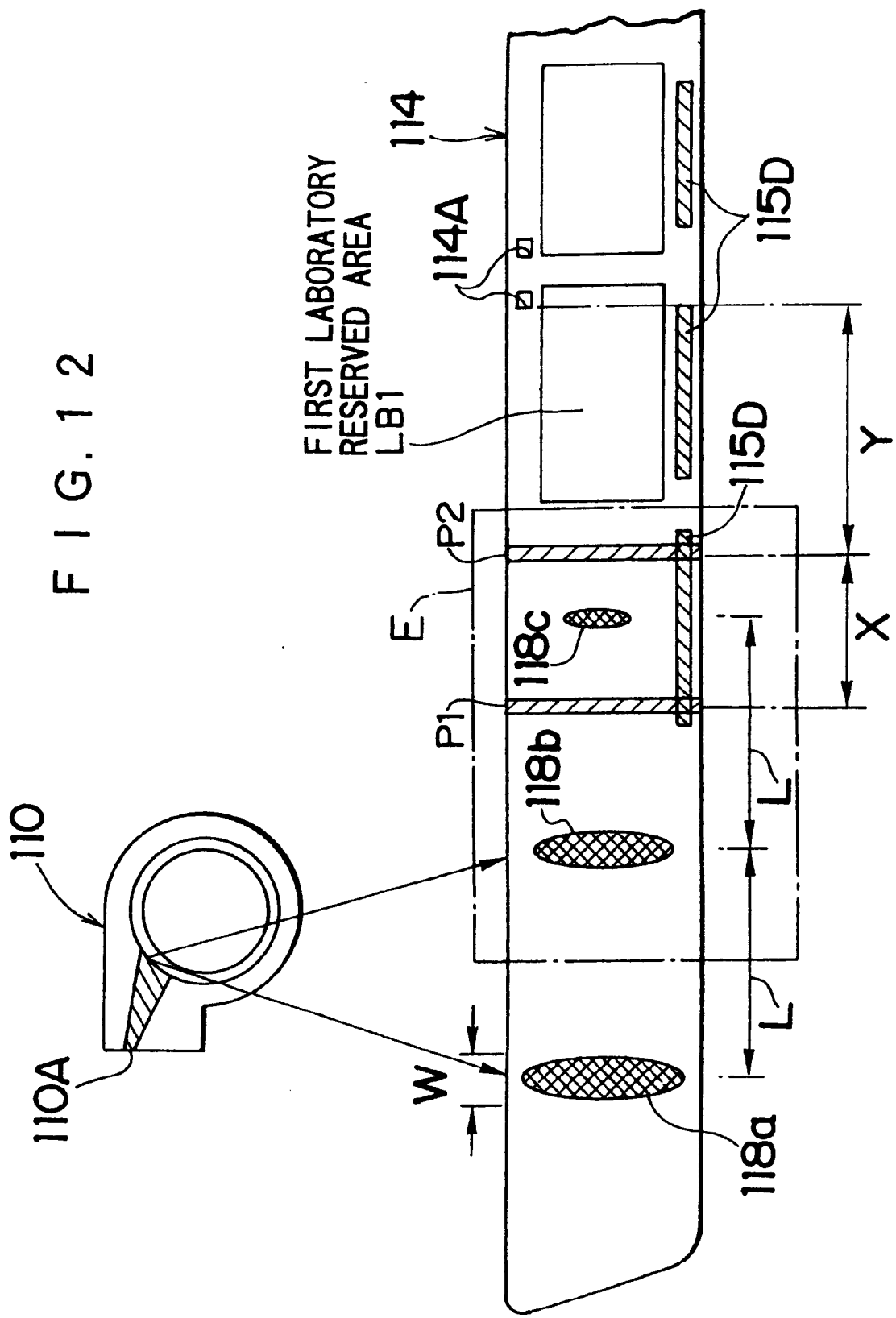

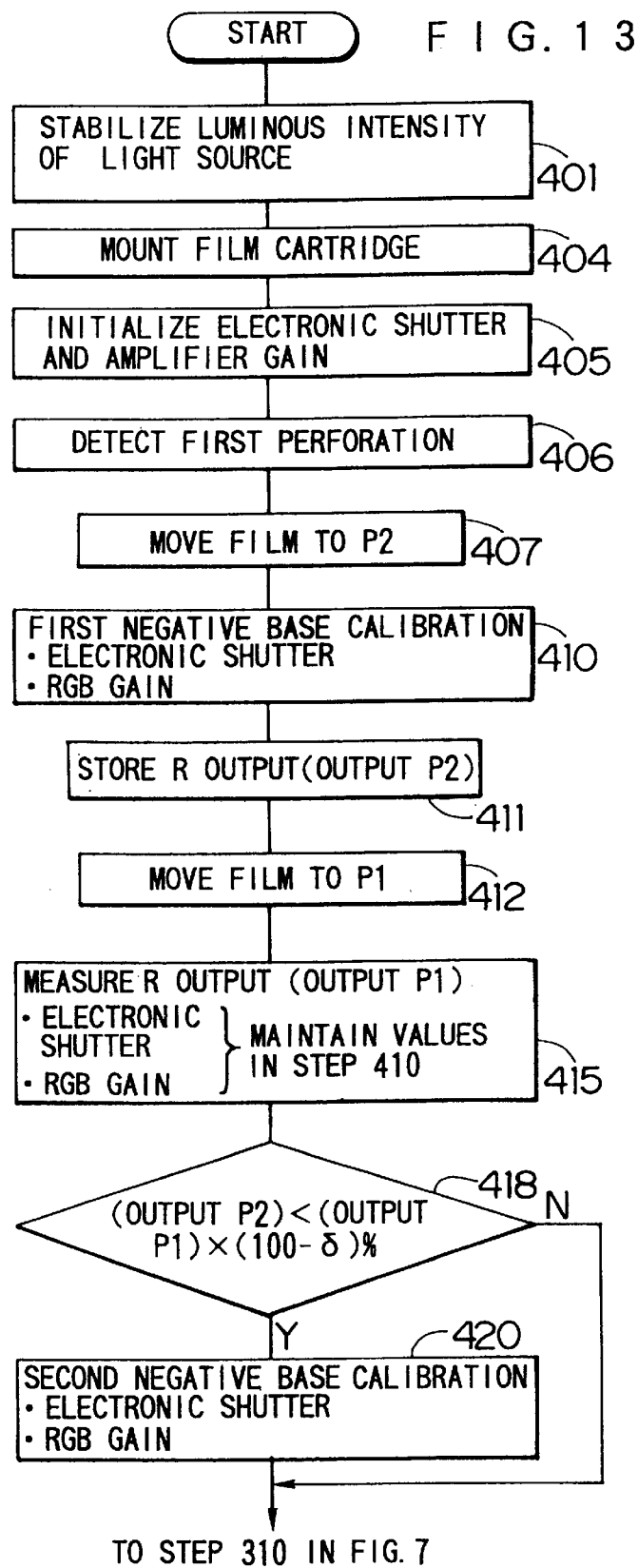

F I G. 1 4
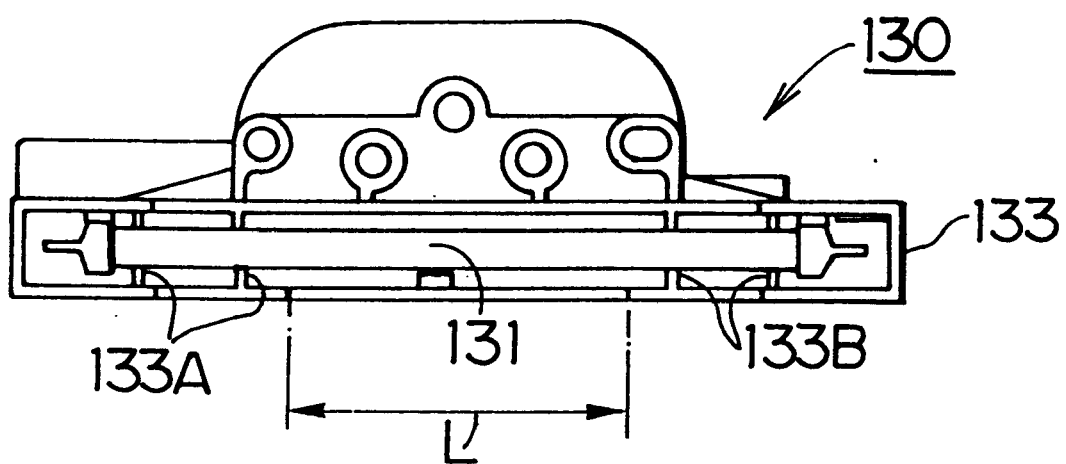

METHOD OF CONTROLLING EXPOSURE IN FILM SCANNER

BACKGROUND OF THE INVENTION

1. Field of the Invention

The present invention relates to a method of controlling exposure in a film scanner. More particularly, the present invention relates to a method of controlling exposure in a film scanner which captures an image on a developed negative film.

2. Description of the Related Art

The well-known conventional film image capturing apparatus, which is disclosed by WO 90/04301, Japanese Patent Application Laid-open No. 5-75922, etc., picks up a developed still photographic film by an image sensor such as a charge coupled device (CCD), converts an image into an image signal, and outputs the signal to a TV monitor, which displays a film image. This type of film scanner controls the exposure by a mechanical diaphragm.

Japanese Patent Application No. 6-101189 discloses a method of controlling the exposure in the film scanner, which controls, before capturing a frame image, the exposure time of the line sensor and the gain of each of analog amplifiers in accordance with the R, G and B output voltages which are output from the line sensor when a negative base (the part which has not been exposed at all) on the film is captured.

There is a problem in that no part is secured as the negative base on the developed film. In order to control the exposure by an electronic shutter of the line sensor as stated above, a calibration in accordance with the R, G and B output voltages of the proper negative base is required. In this case, it is very important to determine how to capture the best area representative of the negative base on the film.

SUMMARY OF THE INVENTION

The present invention has been developed under the above-described circumstances, and has its aim the provision of a method of controlling exposure in a film scanner which predetermines areas having a strong likelihood of being a negative base, and determines the best negative base among them to control the exposure correctly.

The present invention relates to a method of controlling exposure in a film scanner. The film scanner moves a developed still photographic film and a line sensor relatively at a constant speed, which film has a first reserved area provided before a first frame and a second reserved area provided behind a last frame, which areas are reserved for a processing laboratory, the film scanner captures a frame image on the film by the line sensor, and R, G and B output voltages of the line sensor are amplified by analog amplifying means; comprises the steps of: measuring R, G and B output voltages output from the analog amplifying means while capturing at least one of a first negative base area before the first reserved area, a second negative base area just behind the first reserved area, a third negative base area just before the second reserved area, and a fourth negative base area behind the second reserved area; controlling gain of the analog amplifying means, or gain of the analog amplifying means and an exposure time of the line sensor such that each maximum value of the R, G and B output voltages measured in the measuring corresponds to a predetermined reference voltage; and capturing an image of each frame.

In the present invention, a method of controlling exposure in a film scanner, in which the film scanner pulls out a developed continuous still photographic film from a film cartridge and moves the film and a line sensor relatively at a constant speed, which film cartridge is provided with an opening through which the film goes in and out and a single spool around which the film is wound, and the film scanner captures a frame image on the film by the line sensor, and R, G and B output voltages of the line sensor are amplified by analog amplifying means. A preferred embodiment of the method comprises the steps of: locating a negative base area before a reserved area provided before a first frame on the film, the reserved area intended for a processing laboratory; measuring R, G and B output voltages output from the analog amplifying means while capturing, under predetermined and initialized exposure, the negative base in two areas or more which are at a distance (X) from each other, which distance X satisfies the following inequality:

$$W<X<L-W,$$

where W is the maximum width of a part on the film in the longitudinal direction of the film, which part is exposed by light entering the cartridge through the opening, and L is a length in which the film close to the negative base area is wound around the spool by one turn. The method further includes determining an area having the largest value of the measured R, G and B output voltages as a proper negative base area; controlling gain of the analog amplifying means, or gain of the analog amplifying means and an exposure time of the line sensor such that each maximum value of the R, G and B output voltages measured when capturing the determined proper negative base area corresponds to a predetermined reference voltage; and capturing an image of each frame.

In order to achieve the above-mentioned object, the area of the proper negative base of the film is determined by comparing the maximum values of the R output voltages measured in above-mentioned areas in such a state that the exposure conditions and the gain of the analog amplifying means are fixed, or by the gain of R channel of the analog amplifying means when a predetermined calibration is executed in above-mentioned areas.

According to the present invention, at least one of the first negative base area before the first reserved area on the film, the second negative base area just behind the first reserved area, the third negative base area just before the second reserved area, and the fourth negative base area behind the second reserved area is captured by a line sensor under the predetermined and initialized exposure conditions, and R, G and B output voltages output from the analog amplifying means are measured. Next, the gain of the analog amplifying means, or the gain of the analog amplifying means and the exposure time of the line sensor are controlled such that each maximum value of the measured R, G and B output voltages corresponds to the predetermined reference voltage. Then the image of each frame is captured based on the exposure control. Thus, the exposure can be controlled correctly, and the frame image can be captured properly.

Moreover, in another aspect of the method plural areas among the first, second, third and fourth negative base areas are captured, and the gain of the analog amplifying means, or the gain of the analog amplifying means and the exposure time of the line sensor are determined such that each maximum value of R, G and B output voltages corresponds to the predetermined reference voltage. Then the negative base having the smallest gain or the shortest exposure time is determined as the negative base of the film, and the gain or the gain and the exposure time of the negative base area are adopted as the gain or the gain and the exposure time of the film. Thereby, the negative base can be detennined accurately, and the exposure can be controlled correctly in the film wherein the negative base is not secured.

Further, when the capturing is performed in plural negative base areas, the maximum values of R output voltages measured for every negative base area in such a state that the exposure conditions and the gain of the analog amplifier are fixed, so that the negative base area is determined. Moreover, in another embodiment of the present invention, the negative base area is determined according to the gain of R channel of the analog amplifier when a predetermined calibration is executed in each negative base area. Thereby, even if the G and B output voltages are higher than the original negative base due to the interimage effect in which G and B are undercut so that R can be regenerated well when exposed parts appear because of the red light transmitting through the film, the negative base can be determined accurately, and the exposure can be controlled correctly.

Furthermore, according to the present invention, the first negative base area before the first reserved area on the film is captured by the line sensor under the predetermined and initialized exposure conditions, and the first R, G and B output voltages output from the analog amplifying means are measured and stored. Next, the gain of the analog amplifying means, or the gain of the analog amplifying means and the exposure time of the line sensor are controlled such that each maximum value of the first R, G and B output voltages corresponds to the predetermined reference voltage. Then the image of each frame is captured based on the exposure control. After the capturing is completed, the exposure conditions are returned to the initialized predetermined exposure conditions, and the fourth negative base area behind the second reserved area is captured. That is, the fourth R, G and B output voltages of the fourth negative base area, which are output from the analog amplifying means, are measured. Then the fourth R, G and B output voltages are compared to the predetennined reference voltage. If the forth R, G and B output voltages are higher, the gain of the analog amplifying means, or the gain of the analog amplifying means and the exposure time of the line sensor are controlled such that each maximum value of the fourth R, G and B output voltages corresponds to the predetermined reference voltage. After that, the image of each frame is captured again. The negative bases of the first and second negative base areas having a strong likelihood of being the negative base are measured, and they are compared to each other, so that the best negative base can be determined easily. Moreover, each negative base area is captured in the film transporting sequence, and thereby the film can be transported efficiently.

According to another embodiment of the present invention, the negative base is measured in two areas which are at a predetermined distance (X) from each other, so that the measuring is perfonned at least once in the area of the proper negative base where the exposed part does not appear, even if the exposed part appears in the negative base area before the reserved area in the film due to the light entering through the opening of the film cartridge.

That is, taking into consideration that the exposed parts appear periodically at every turn cycle L of the film close to the negative base area, the calibration is executed at least twice in areas which are at a distance X from each other, which distance X satisfies the following inequality:

W<X<L-W, where L is the turn cycle, and W is the maximum width of the anticipated exposed part. Then, the area of the exposed part can be avoided at least once. Thereby, the best negative base can be determined easily, and the exposure can be controlled correctly.

Furthermore, when the exposed part appears in the negative base area before the reserved area on the film due to the light entering through the opening of the film cartridge, the exposed part appears in the inner layer due to the red light transmitting through the negative base. In this case, the undercut effect on t and B, that is the interimage effect occurs, and the output of G and B appears to increase. Hence, according to another embodiment of the present invention, in view of R output voltage with no interimage effect, the negative base area is determined by comparing R output voltages of the analog amplifier in plural areas. Thus, it is prevented that the calibration is executed by means of G and B output with the interimage effect. Thereby, the best negative base can be determined easily, and the exposure can be controlled correctly.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 9(A), 9(B), 9(C) and 9(D) are views showing a storage area in the index image buffer, a storage area in the display buffer, the display screen of the TV monitor, and a storage area in the image data buffer, respectively, in the film scanner in FIG. 3;

FIG. 10 is a view showing the second embodiment of the present invention;

FIG. 12 is a view showing the fourth embodiment of the present invention;

FIG. 13 is a flow chart showing the method of controlling the exposure in the film scanner according to the fourth embodiment of the present invention;

FIG. 14 is a front view of a light source in FIG. 3;

DETAILED DESCRIPTION OF THE PREFERRED EMBODIMENTS

Figure 1:
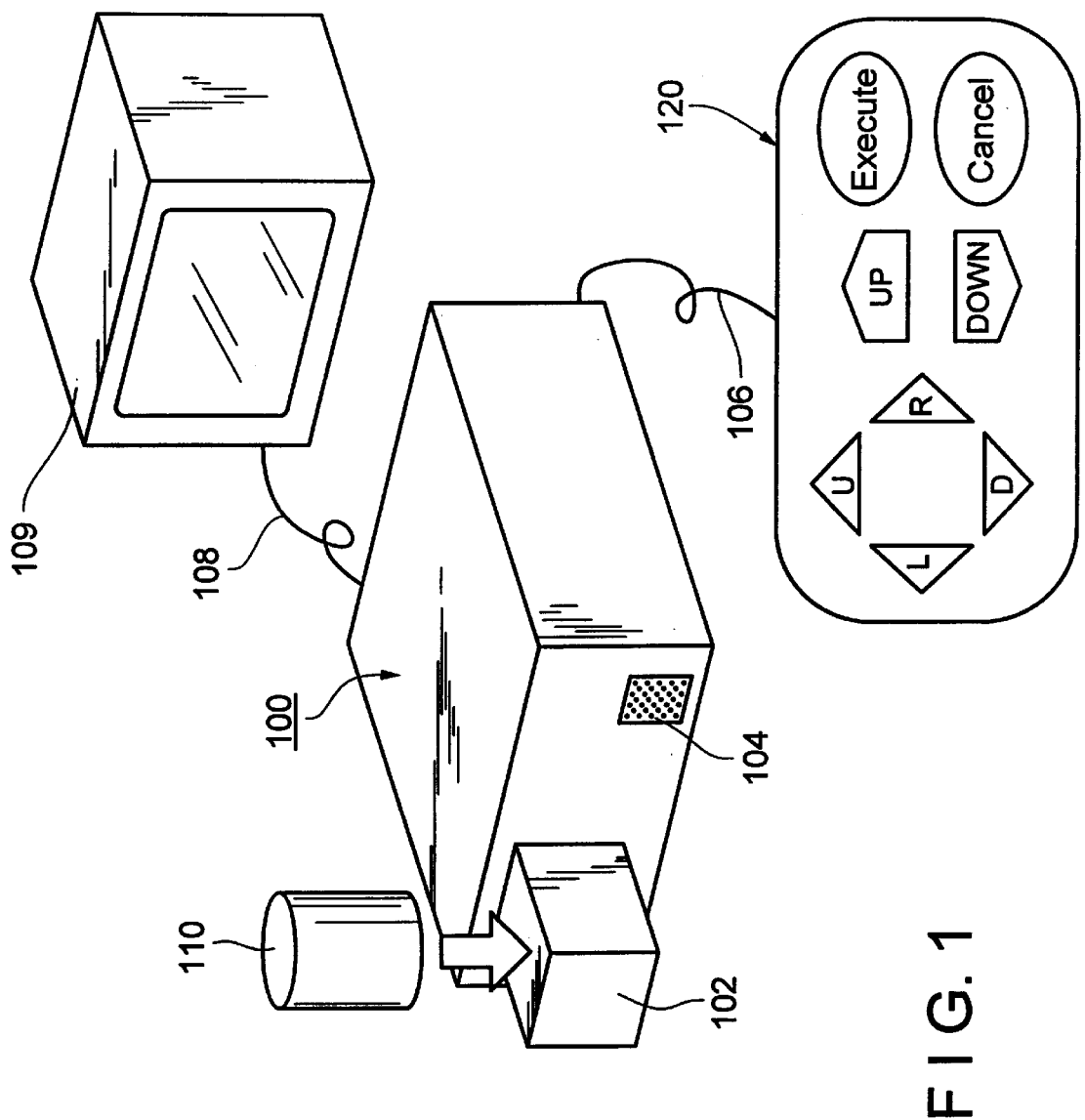
FIG. 1 is a perspective view showing the structure of the whole system including a film scanner to which a method of controlling exposure in a film scanner according to the present invention is applied.

FIG. 1 is a perspective view illustrating an overall structure of the whole system including a film scanner according to the method of controlling the exposure in the film scanner of the present invention. As shown in the figure, the film scanner 100 is rectangular-parallelepiped, and a film cartridge tray 102 and a power switch 104 are provided at the front of the film scanner 100. The film cartridge tray 102 is driven to move forward and backward when a film cartridge 110 is loaded and unloaded, and thus the film cartridge 110 is taken in and out.

The film scanner 100 connects to a key pad 120 and a monitor TV 109, and various kinds of operational signals are sent from the key pad 120 to the film scanner 100 via a signal cable 106 in order to control the film scanner 100. A video signal is output from the film scanner 100 to the TV monitor 109 via a signal cable 108.

A detailed explanation will be given later about the key pad 120 controlling the film scanner 100.

Figure 2:
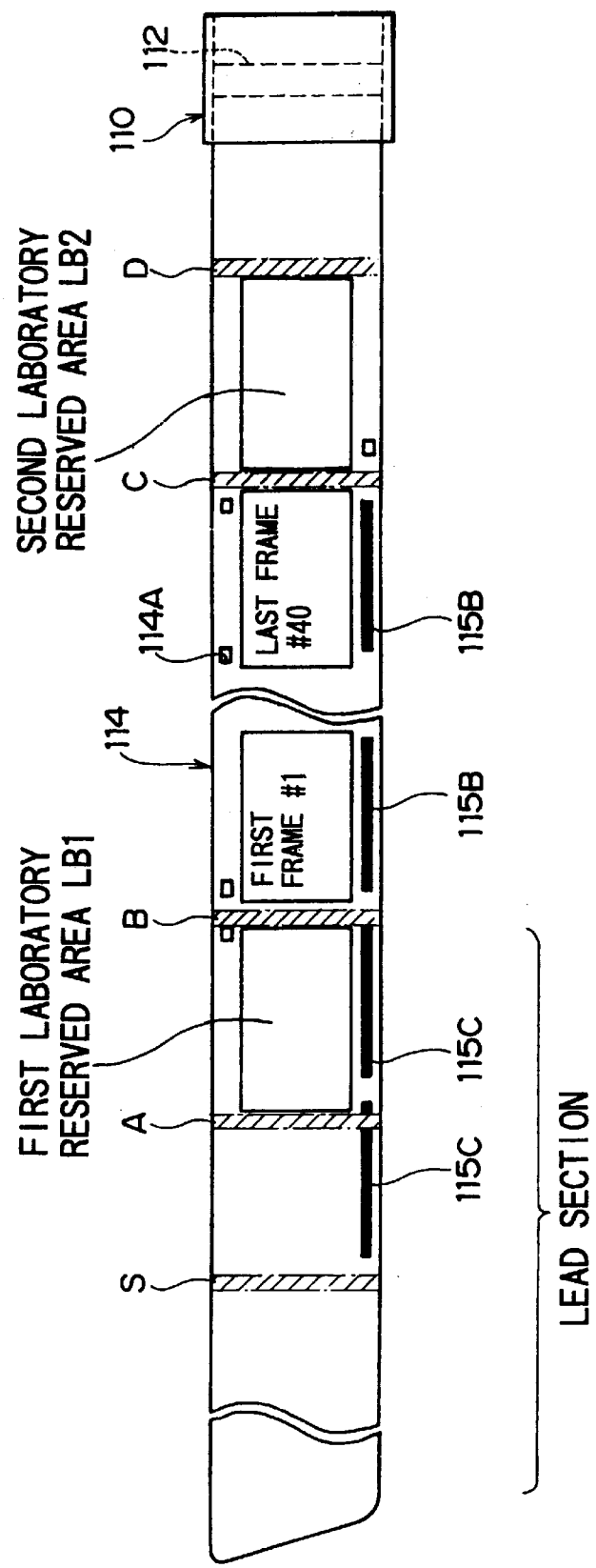
FIG. 2 is a view showing an example of a film cartridge applied to the film scanner in FIG. 1.

FIG. 2 is a view illustrating an example of a film cartridge 110 applied to the film scanner 100 in FIG. 1. As shown in FIG. 2, the film cartridge 110 has a single spool 112, and a photographic film 114 is wound around the spool 112. A perforation 114A is punched on the film 114 to indicate a position of each frame, and magnetic record layers are formed on the whole surface or at the edge of the film 114. The magnetic data representing the photographing data for each frame can be recorded onto the magnetic record layers by a camera provided with a magnetic head.

The recorded magnetic data relates to a frame number, a print format which indicates a high-vision image, panoramic image or a normal image, the date/time of photographing, and the like. Many kinds of data can be recorded by the camera. A bar code for representing the film type, the frame number, etc. can be optically recorded in an area except for a frame area which is exposed by a subject light.

A first laboratory reserved area LB1 and a magnetic track are provided to the forward end side of the first frame #1 on the film 114, and a second laboratory reserved area LB2 is provided to the back end side of the last frame #40 on the film 114.

In this case, the forward end side of the perforation 114A indicating the position of the first frame #1 is referred to as a leader section, and a magnetic track at the leader section is referred to as a leader track 115C. The back end side of the perforation 114A indicating the position of the first frame #1 is referred to as a frame section, and a magnetic track at the frame section is referred to as a frame track 115B. The magnetic data for the whole roll is recorded on the leader track 115C, and the magnetic data for each frame is recorded on the frame track 115B. A bar code (not shown) for representing an identification mark of the film is written at the edge of the leader section of the film 114.

The developed film 114 is wound up into the film cartridge 110, and thereby the film 114 can be stored.

There are four following areas, which are very likely to be the negative base on the film 114.

(a) Area A just before the first laboratory reserved area LB1
(b) Area B just behind the first laboratory reserved area LB1 and between the area LB1 and the first frame #1
(c) Area C just before the second laboratory reserved area LB2 and between the second laboratory reserved area LB2 and the last frame #40
(d) Area D just behind the second laboratory reserved area LB2

The areas between the frames are exposed in the photographing in many cases, and the vicinities of the forward and back ends on the film are exposed to light in many cases when the film is taken out from the film cartridge at the processing laboratory, and there is hence little likelihood that these areas are the negative base.

The likelihood of the above-mentioned areas being the negative base becomes stronger in the following order: B<C<A<D. It is unlikely that the areas A and D are exposed in the photographing, and in particular, there is a strong likelihood of the area D being the negative base, because the area D is located at the innermost of the cartridge. On the other hand, the areas B and C are likely to be exposed in the photographing, and in particular, the area B is very likely to be exposed, because the area B is located at the forward end of the film.

Figure 3:
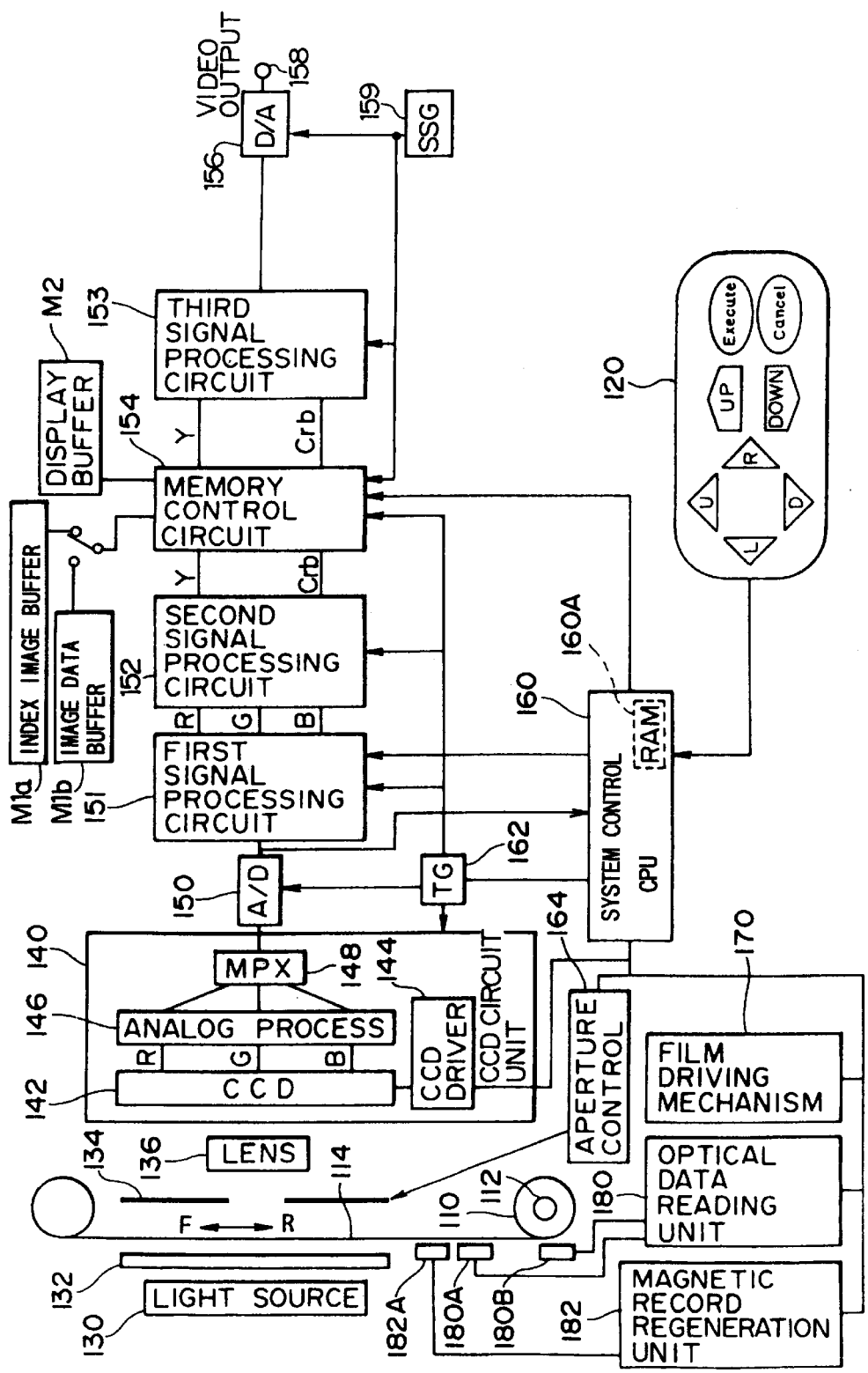
FIG. 3 is a block diagram showing an embodiment of the inner structure of the film scanner in FIG. 1.

FIG. 3 is a block diagram illustrating an embodiment of the inner structure of the film scanner 100. The film scanner 100 mainly comprises a light source 130 for illumination, a taking lens 136, a CCD circuit unit 140 including a CCD line sensor 142, a first signal processing circuit 151, a second signal processing circuit 152, a third signal processing circuit 153, a memory control circuit 154, an index image buffer M1a, an image data buffer M1b, a display buffer M2, a central processing unit (CPU) 160, a film driving mechanism 170, an optical data reading unit 180, and a magnetic record regeneration unit 182.

As shown in FIG. 14, the light source 130 consists of a fluorescent light 131, which extends in the transporting direction of the film 114, and a holder 133 for holding the fluorescent light 131. The fluorescent light 131 uses the mercury gas, and it is held in the holder 133 by holding sections 133A, 133B, etc. of the holder 133.

In the fluorescent light, the mercury gas tends to condense in the coolest area of the tube into droplets. The mercury droplets which are formed in the fluorescent light appear in the illumination light in the form of the shade, and thus they are harmfuil. Moreover, if the mercury droplets evaporate and diffuse while the fluorescent light is being lighted, it causes no problem. In some cases, however, when the mercury droplets evaporate, the fluorescent material on the inner wall of the tube is peeled off, and luminescent spots of high luminance are created, and thus they are harmfuil.

Figure 4:
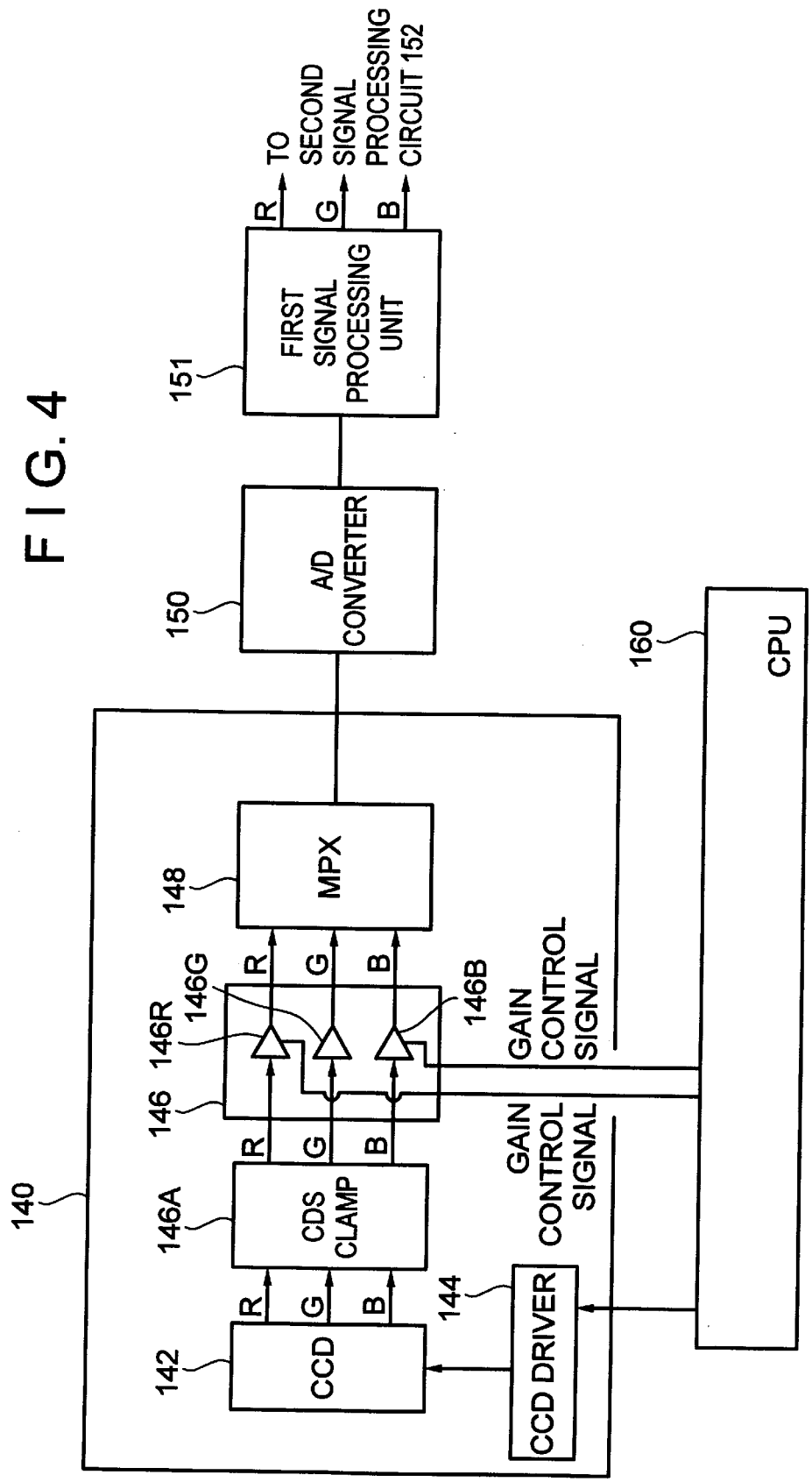
FIG. 4 is a block diagram showing an example of the signal processing in a CCD circuit unit 140 in FIG. 3.

For the reasons stated above, the holding sections 133A, 133B, etc. (the area where the tube is cooled the most) of the holder 133 are arranged at the outside of the used range (effective length) L of the fluorescent light 131 as shown in FIG. 4. The holding position in the direction of the diameter of the fluorescent light 131 is outside of the used surface. The condensation of the mercury and the peeling of the fluorescent material, which take place in the coolest area in the fluorescent light 131, do not affect the illumination light.

The illumination light from the light source 130 illuminates the film 113 through an infrared cutting filter 132 as shown in FIG. 3. An image light passing through the film 114 is fonned on the light accepting surface of the CCD line sensor 142 via a taking lens 136 of the fixed-focused type. While the CCD line sensor 142 is picking up the film image, the film driving mechanism 170 transports the film 114 at a constant speed in the direction of an arrow F (hereinafter referred to as the forward direction) or an arrow R (hereinafter referred to as the backward direction). The transporting of the film will be explained later in detail.

The CCD line sensor 142 is provided in the direction perpendicular to the film transport direction. The image light, which is formed on the light-accepting surface of the CCD line sensor 142, is charge-accumulated for a predetermined period of time in each sensor having R, G or B filter. Then, the image light is converted into the signal charge of R, G or B in accordance with the intensity of the light. The signal charge, which is accumulated in the above-mentioned manner, is read to a shift register by a lead gate pulse of a predetermined cycle supplied by the CCD driving circuit 144, and is read out sequentially by a register transfer pulse supplied by the CCD driving circuit 144.

The CCD line sensor 142 is provided with a shutter gate and a shutter drain (not shown) adjacent to each light accepting part. If the shutter gate is driven by a shutter gate pulse, the electric charge in the light accepting part can be swept into the shutter drain. That is, the CCD line sensor 142 has a so-called electronic shutter function for controlling the electric charge, which is accumulated in the light accepting part, according to the shutter gate pulse supplied by the CCD driving circuit 144.

In this embodiment, a cycle of one line in the lead gate pulse is 1.6 ms, and the shutter gate pulse is controlled so as to be supplied at a predetermined timing, in which the time between 576 ns and 1.6 ms is divided by 255. The CPU 160 controls the CCD driving circuit 144, and controls the shutter of the CCD line sensor 142 with the shutter gate pulse via the CCD driving circuit 144 so that the shutter range varies between 15% and 100%.

The CCD line sensor 142 has a sensor of 1024 pixels for example in the direction perpendicular to the film transport direction. If there is no change in the cycle of the lead gate pulse, etc. in the CCD driving circuit 144, the number of pixels of one frame in the same direction as the film transport direction varies according to the film transport speed. In this embodiment, when the film transport speed is ½, 1, 8, 16 times as fast as the transport speed in the case when the standard film image is captured, the number of pixels is 1792, 896, 112, and 56 pixels, respectively.

The signal charge, which is read from the CCD line sensor 142, is clamped by a CDS clamp 146A, and is sent to an analog processing circuit 146 as R, G and B signals. The gain, etc. of the R, G and B signals is controlled in the analog processing circuit 146. The gain control will be explained later (see FIG. 4).

The R, G and B signals, which are output from the analog processing circuit 146, are made to be dot-sequential by a multiplexer 148, and they are converted into digital signals by an A/D converter 150. Then, they are sent to the first signal processing circuit 151 and the CPU 160.

The first signal processing circuit 151 includes a white balance adjusting circuit, a negative-positive inverting circuit, a γ-correction circuit, an RGB coincidence circuit. The first signal processing circuit 151 executes the signal-processing of the dot-sequential R, G and B signals, which are inputted sequentially, in each circuit, and then it outputs the R, G and B signals which are made to be coincident to the second signal processing circuit 152.

Figure 5:
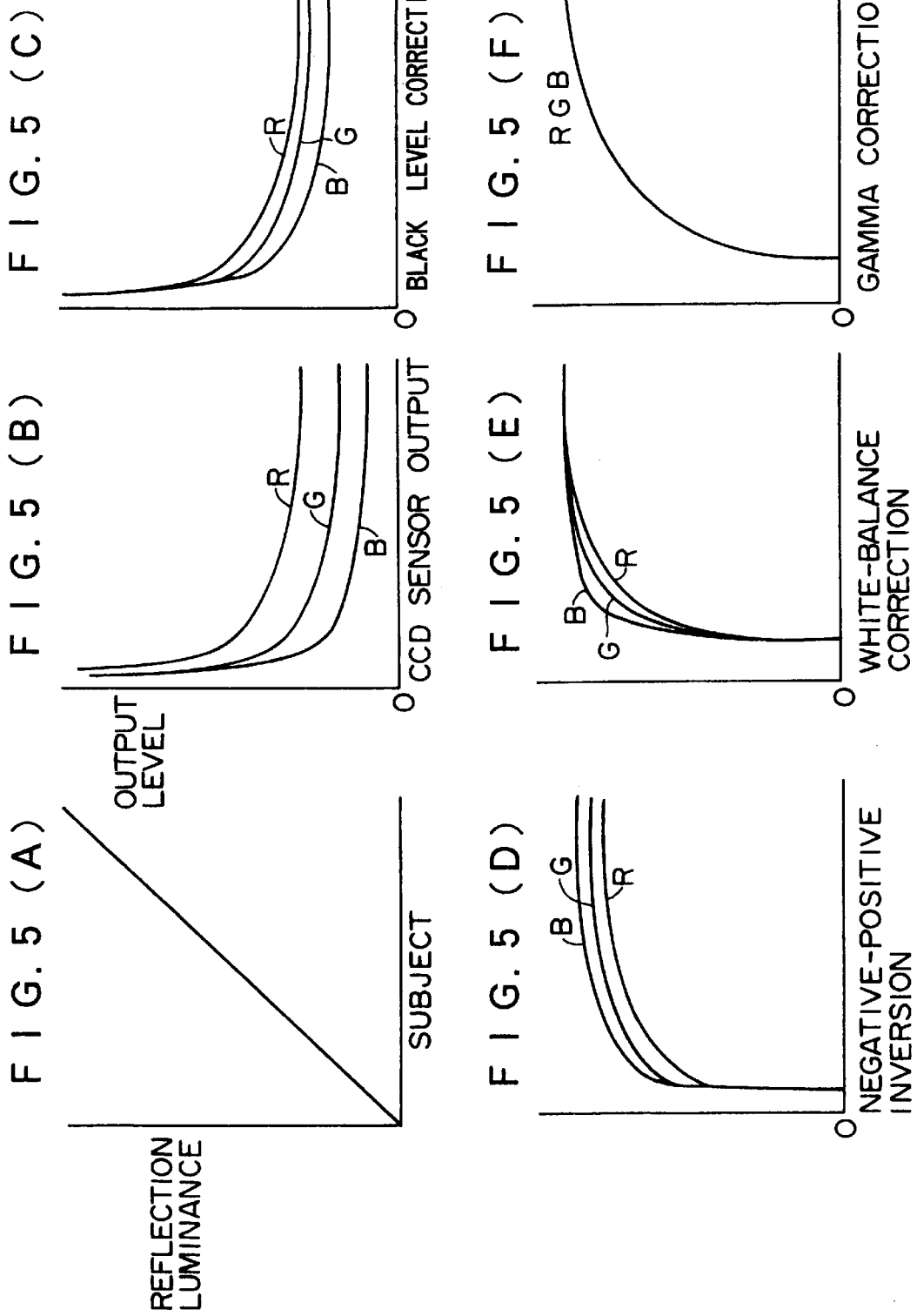
FIGS. 5(A), 5(B), 5(C), 5(D), 5(E) and 5(F) are views showing a gradation of an output signal from each part of the first signal processing circuit 151.

FIGS. 5 (A), 5(B), 5(C), 5(D), 5(E), and 5(F) show the gradation of an output signal from each part in the first signal processing circuit 151.

If the CCD line sensor 142 picks up the negative film, on which the subject gradation increases linearly as shown in FIG. 5(A) is photographed, the R, G and B output signals from the CCD line sensor 142 have characteristics as shown in FIG. 5(B) because of the gamma of the negative film.

The first signal processing circuit 151 performs the signal processing of the inputted R, G and B signals with regard to the black level correction, the negative-positive inversion, the white level correction, and the gamma correction. First, the offset value for each of R, G and B signals is added to the inputted R, G and B signals, so that the peak values (the black level of the positive image) of R, G and B signals are equalized (see FIG. 5(C)).

Next, the first signal processing circuit 151 subtracts each of the offset R, G and B signals from a predetermined peak value in the negative-positive inverting circuit, and executes the negative-positive inversion of R, G and B signals. FIG. 5(D) shows the negative-positive inverted R, G and B signals. Then, the negative-positive inverted R, G and B signals are multiplied by the gain adjustment coefficient for each of R, G and B signals according to the control signal sent from the CPU 160, so that the white-balance correction can be executed. That is, as shown in FIG. 5(E), the other peak values (the white level of the positive image) of R, G and B signals are equalized. The gamma correction circuit executes different gamma corrections for R, G and B signals of which white balance has been adjusted. Thereby, the intermediate gradation of R, G and B signals is equalized, and the gradation has a predetermined gamma (γ=0.45) (see FIG. 5(F)).

The second signal processing circuit 152 has a matrix circuit, and generates a luminance signal Y and a chroma signal $C_{r/b}$ according to the inputted R, G and B signals, and outputs them to a memory control circuit 154.

The memory control circuit 154 controls the reading and writing of the luminance signal Y and the chroma signal $C_{r/b}$ from and into the index image buffer M1a or the image data buffer M1b, and it also controls the reading and writing of the luminance signal Y and the chroma signal $C_{r/b}$, which are stored in the index image buffer M1a or the image data buffer M1b, from and into a display buffer M2. A detailed explanation will be given later about the control of the reading and writing from and into the CCD buffers M1a and M1b and the display buffer M2 (see FIG. 9(C)).

The luminance signal Y and the chroma signal $C_{r/b}$ which are read from the display buffer M2 by the memory control circuit 154 are sent to the third signal processing circuit 153. The third signal processing circuit 153 generates, for example, a color composite video signal of the NTSC system according to the inputted luminance signal Y and the chroma signal $C_{r/b}$, and outputs it to a video output terminal 158 via a D/A converter 156. A synchronizing signal of a predetermined cycle is sent to the memory control circuit 154, the third signal processing circuit 153, and the D/A converter 156 from a synchronizing signal generating circuit 159. Thereby, each circuit is synchronized, and a video signal including the synchronizing signal can be obtained.

A timing signal is sent to each of the CCD circuit unit 140, the A/D converter 150, the first signal processing circuit 151, the second signal processing circuit 152, and the memory control circuit 154 from a timing signal generating circuit 162 controlled by the CPU 160, and each circuit is thereby synchronized.

The CPU 160 receives the dot-sequential R, G and B signals of all frames from the A/D converter 150, and calculates the gain adjustment coefficient of each color signal so as to adjust the white balance. Then, the CPU 160 stores the offset data representing the offset value of each color and the AE/AWB data representing the gain adjustment coefficient for every frame in a RAM 160A built in the CPU 160.

The film driving mechanism 170 engaged with the spool 112 of the film cartridge 110, and comprises a film supplying part, which rotates the spool 112 forward and backward, a film windup part, which winds up the film 114 sent from the film supplying part, and a means which is provided in a film transport passage to transport the film 114 at a constant speed through and between a capstan and a pinch roller (not shown). The film supplying part drives the spool 112 of the film cartridge 110 clockwise in FIG. 3, and transports the film 114 from the film cartridge 110 until the leader of the film is wound up by the film winding part.

An optical data reading unit 180 includes a first optical sensor 180A which optically detects the perforation 114A on the film 114, and a second optical sensor 1 80B which optically detects the optical data such as a bar code written at the edge of the film 114. The optical data reading unit 180 processes the optical data, which is detected by the optical sensors 180A and 180B, and outputs them to the CPU 160.

The magnetic record regeneration unit 182 includes a magnetic head 182A, and reads the magnetic data, which is recorded on the magnetic data layers 115B and 115C on the film 114, by the magnetic head 182A. The magnetic record regeneration unit 182 processes the magnetic data and sends it to the CPU 160, and converts the writing data, which is sent from the CPU 160, into signals which are suitable for magnetic recording. Then, the magnetic record regeneration unit 182 sends the signals to the magnetic head 182A, and records them onto the magnetic record layers 115B and 115C.

Figure 6:
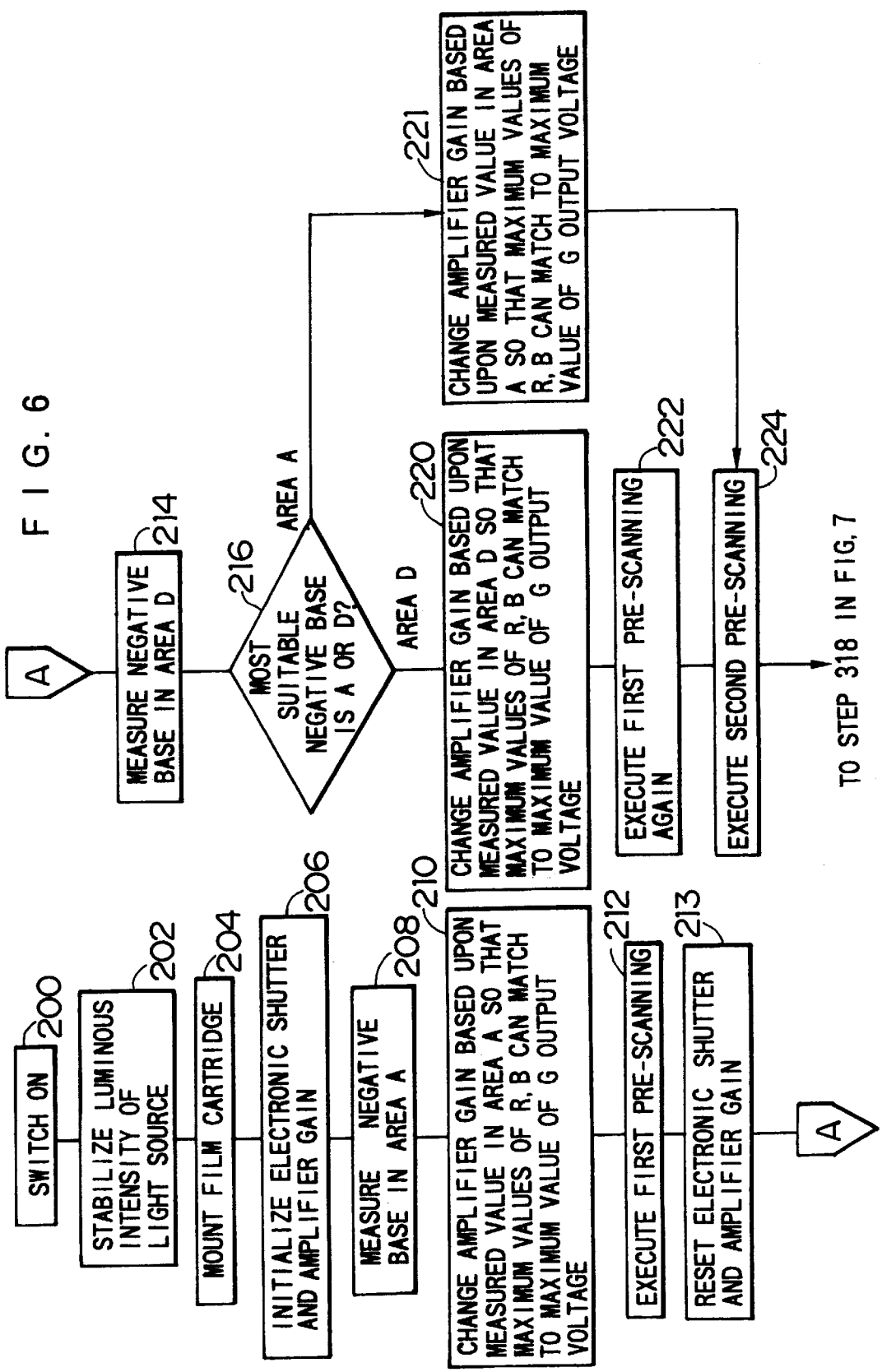
FIG. 6 is a flow chart showing the first embodiment of the method of controlling the exposure in the film scanner according to the present invention.

Next, an explanation will be given about the operation of the film scanner with reference to the flow charts of FIGS. 6 and 7.

First, the film scanner 100 is turned on (Step 200) to light the light source 130. After the luminous intensity of the light source 130 is stabilized (Step 202), the film cartridge 110 is set in the film scanner 100 (Step 204).

Second, the film 114 is pulled out from the film cartridge 110, and when the optical data reading unit 180 detects the first perforation 114A on the film 114, the pulling-out of the film 114 is stopped (the area B in FIG. 2). Then, the film is rewound by a predetermined length, so that it can return to an area before the leader track 115C (an area S in FIG. 2). The film 114 is transported so that the magnetic head 182A reads the magnetic data which is recorded on the leader track 115C, until the area A on the film 114 reaches the CCD line sensor 142.

The calibration is executed in the area A (Steps 206, 208 and 210). That is, the electronic shutter of the CCD line sensor 142 is set to 15% as an initial value, and the amplifier gain is set to a predetermined value (an initial value) (Step 206).

The gain of analog amplifiers 146R, 146G and 146B is adjusted such that the R, G and B output voltages which are output from the analog amplifiers 146R, 146G and 146B when the CCD line sensor 142 captures a typical negative base at such predetermined reference voltages that they are substantially equal and are not saturated.

Figure 15:
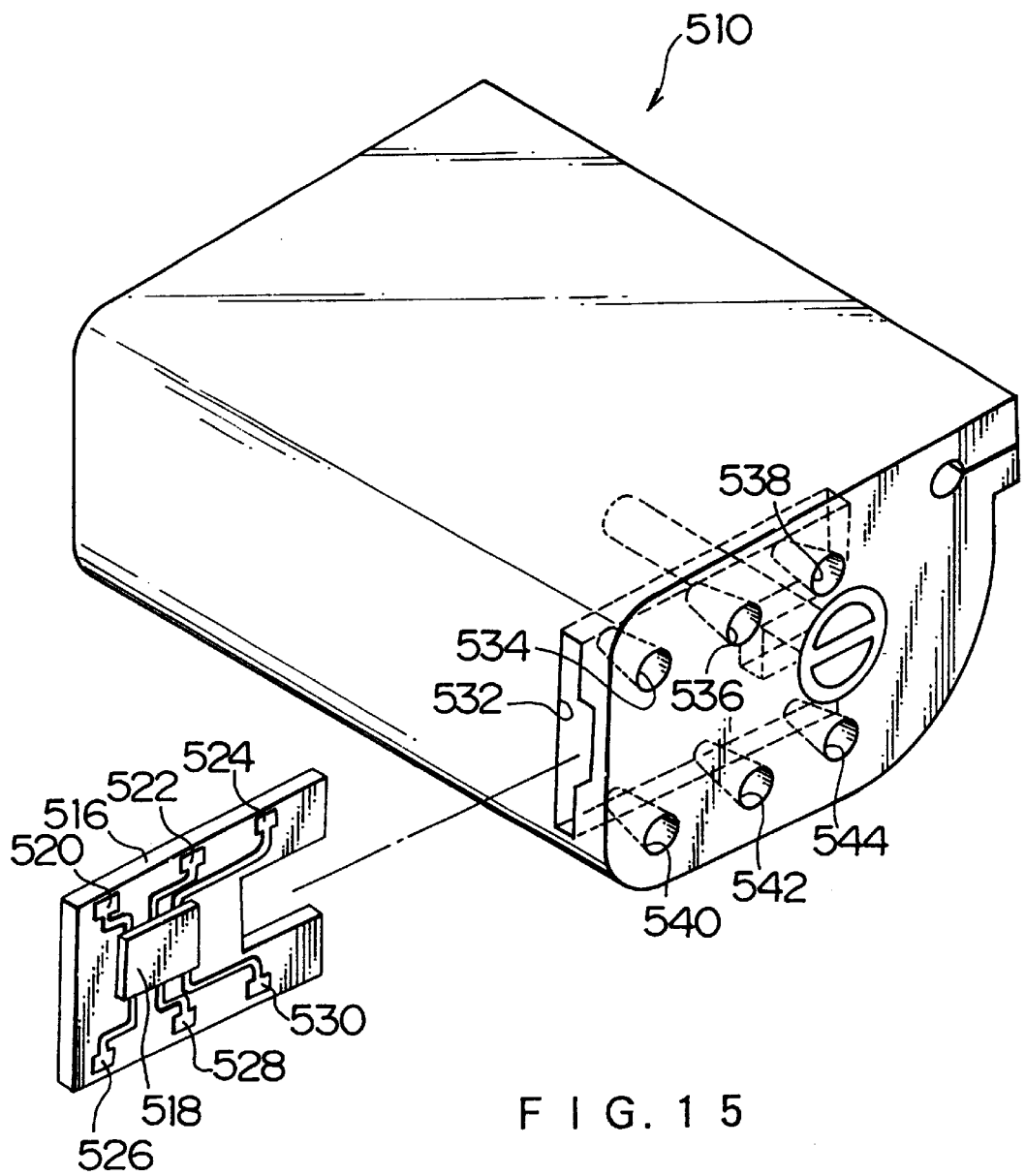
FIG. 15 is a view showing another example of a film cartridge applied to the film scanner in FIG. 1.

The tone of the film varies with the film type (the film manufacturer for example), and hence the initialization can be performed according to the determined film type. In this case, the film type is determined by reading a bar code (a manufacturer code for example) recorded at the leader section of the film. In addition, as shown in FIG. 15, the film type may be read from an IC unit 516 mounted in a film cartridge 510. The IC unit 516 is housed in a housing section 532 of the film cartridge 510, and it has a non-volatile memory 518, in which the information relating to the film cartridge such as the film type is stored, and six electrode plates 520 through 530 for reading the information from the non-volatile memory 518. In the film cartridge 510, six contact pin holes 534 through 544 are formed at positions corresponding to the six electrode plates 520 through 530 of the IC unit 516.

On the other hand, stored in the film scanner according to the film type are the gain of the analog amplifiers 146R, 146G, and 146B and the exposure time of the line sensor for adjusting (initialization) the R, G and B output voltages outputted from the analog amplifiers 146R, 146G, and 146B to be such a predetermined reference voltage that they are substantially equal and are not saturated. The identifying information corresponding to the film type is read from the aforementioned bar code or the IC unit 516, so that the gain of each analog amplifier and the exposure time of the line sensor for the film type can be read. The initialization is performed based upon the read gain for the analog amplifiers and the exposure time for the line sensor. If the gain of each analog amplifier and the exposure time of the line sensor for the film type are not stored, the initialization is performed based upon the gain of each analog amplifier and the exposure time of the line sensor for the typical negative base.

The CCD line sensor 142 picks up the negative base on the film 114 in the area A in the aforementioned initialized state. The output voltages of R, G and B, which are output from analog amplifiers 146R, 146G and 146B, are stored (Step 208).

Then, the difference between the maximum value d of the G output voltage, which is output from the analog amplifier 146G, and the reference voltage (2 V for example), is computed, and the exposure time of the electronic shutter is changed so that the maximum value d can be 2 V.

Next, as shown in FIG. 4, the CPU 160 sends the gain control signals to the analog amplifiers 146R and 146B, so that the maximum values of the R and B output voltages, which are output from the analog amplifiers 146R and 146B, can be 2 V (Step 210).

The negative base may be measured first in the area B, and then the negative base in the area A may be measured. In this case, the R, G and B output voltages which are measured and stored for the area B, are compared with the R, G and B output voltages which are measured and stored for the area A. Then, the area of which output voltages are higher is determined to be the proper negative base area, and the gain of the analog amplifiers 146R, 146G and 146B and the exposure time of the CCD line sensor 142 are controlled so that the maximum values of the R, G and B output voltages which are output from the analog amplifiers 146R, 146G and 146B in the measuring of the proper negative base area, can match to a predetermined reference voltage. Because the likelihood of being the negative base is A>B, the measuring of the negative base in the area B may be omitted.

Following Step 210, the first pre-scanning is executed (Step 212). That is, in the first pre-scanning, the film 114 is transported forward at a high speed of 148.0 mm/sec, and the image data is captured via the CCD line sensor 142, and the magnetic data is read via the magnetic data regenerating unit 182. The AE/AWB data and the magnetic data are thereby obtained.

After the first pre-scanning in the forward transporting of the film 114 is completed, the film 114 is pulled out up to the last frame #40, and the area C (see FIG. 2) reaches the CCD line sensor 142. The film 114 is further pulled out from the position, and the R, G and B output voltages are measured in the area D in such a state that the electronic shutter and the amplifier gain are set to the initial value (Steps 213 and 214).

Then, the R, G and B output voltages in the area D are compared with the R, G and B output voltages in the area A, which have been stored before the first pre-scanning, and the area of which output voltages are higher is determined to be the best negative base area (Step 216).

The negative base may be measured first in the area C, and then the negative base in the area D may be measured. In this case, the R, G and B output voltages which are measured and stored for the area B, are compared with the R. G and B output voltages which are measured and stored for the area A. Then, the area of which output voltages are higher is determined to be the proper negative base area, and the gain of the analog amplifiers 146R, 146G and 146B and the exposure time of the CCD line sensor 142 are controlled so that the maximum values of the R, G and B output voltages which are output from the analog amplifiers 146R, 146G and 146B in the measuring of the proper negative base area, can match to a predetermined reference voltage. Because the likelihood of being the negative base is D>C, the measuring of the negative base in the area C may be omitted.

If the proper negative base is determined to be in the area D in Step 216, the calibration is executed according to the measurement values obtained from the proper negative base. Then, the first pre-scanning is performed again (Step 222), and the second pre-scanning is performed when the film 114 is transported backward (Step 224). On the other hand, if the proper negative base is determined to be in the area A, the electronic shutter and the amplifier gain return to the state in above-mentioned Step 210 (Step 221), and the second pre-scanning is performed (Step 224).

FIG. 4 illustrates the case when the exposure time of the electronic shutter is controlled according to the G output voltage of the R, G and B output voltages of the negative base, and the gain of the analog amplifiers 146R, 146G and 146B is controlled according to the R and B output voltages; however, the calibration method is not restricted to this. In another method, the electronic shutter, the gain of the analog amplifiers 146R, 146G and 146B, etc. are set to the initial value (Step 213), and the CCD line sensor 142 picks up the negative base. Then, the gain of each signal is raised by the feed back control in such a manner that the maximum value of the R, G and B output voltages which are outpLIt from the CCD line sensor 142 can be the reference voltage (i.e. 2 V) (Steps 210, 220 and 221).

In this case, the CPU 160 sends the gain control signal to the amplifiers 146R, 146G and 146B, and the calibration is executed in such a state that the maximum value of the R, G and B output voltages is the reference voltage (i.e. 2 V).

In FIG. 4, the proper negative base area is determined according to the R, G and B output voltages stored for each area; however, the present invention is not restricted to this. If the calibration is executed for plural areas, the gain in each area is compared, and the area of which the smallest gain is determined to be the proper negative base area. The gain of the negative base area can be adopted as the proper gain for the film.

Figure 8:
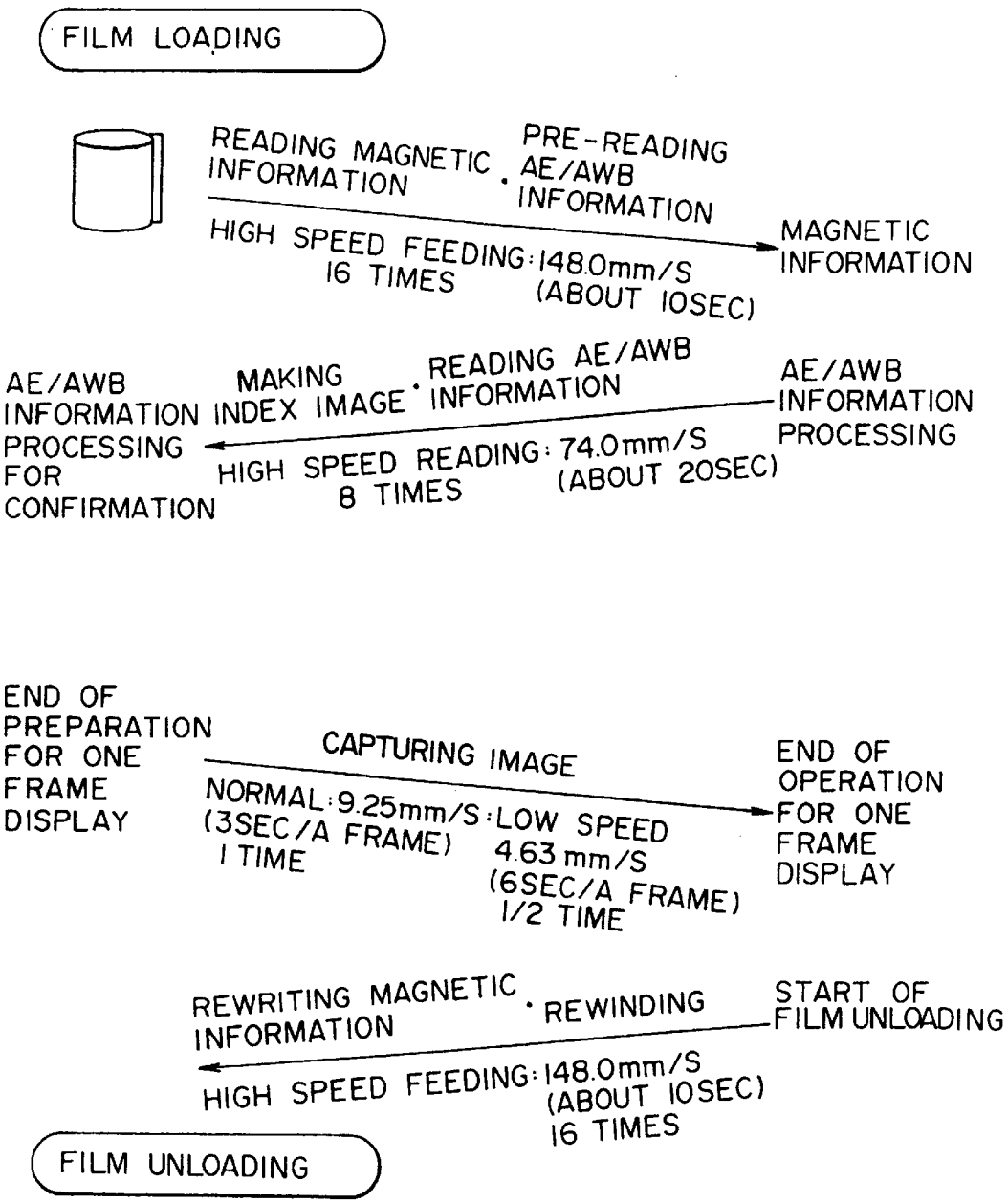
FIG. 8 is a view showing an example of the sequence when the film is fed in the film scanner in FIG. 1.

In the second pre-scanning (Step 224), as shown in FIG. 8, the film 114 is transported backward at a high speed of 74.0 mm/sec, and the image data is captured again via the CCD line sensor 142. When the image data is captured, the CPU 160 controls the electronic shutter of the CCD line sensor 142 according to the AE/AWB data which is stored in the RAM 160A. That is, the charge accumulation time of the CCD line sensor 142 is controlled via the CCD driving circuit 144, so that the exposure can be adjusted.

The CPU 160 makes the first signal processing circuit 151 adjust the offset value and the white balance of R, G and B signals for each frame. That is, the CPU 160 sends the offset data for each color signal of each frame, which is stored in the RAM 160A, to the first signal processing circuit 151. The first signal processing circuit 151 adjusts the offset value of dot-sequential R, G and B signals according to the offset data. Likewise, the CPU 160 sends the AE/AWB data for each color signal of each frame, which is stored in the RAM 160A, to the first signal processing circuit 151. The first signal processing circuit 151 adjusts the gain of dot-sequential R, G and B signals according to the AE/AWB data.

The image data of each frame is adjusted according to the AE/AWB data, etc., and thereby the satisfactory image data can be captured regardless of the photographing conditions of each frame. At the same time, the much more detailed AE/AWB data is obtained, and the RAM 160A is rewritten and stored.

The image data of each frame, which is adjusted in the above-described manner, that is, the luminance signal Y and the chroma signal $C_{r/b}$, which are sent from the second signal processing circuit 152, are sequentially stored in the index image buffer M1$a$ via the memory control circuit 154. In this case, as shown in FIG. 8, because the film 114 is transported at a speed which is 8 times as high as the speed in which the standard film image is captured, the number of pixels in the same direction as the film transport direction of one frame is 112 (see FIG. 9(A)). As stated previously, the CCD line sensor 142 has sensors for 1024 pixels in the direction perpendicular to the film transport direction. The number of pixels is decreased to $\frac{1}{16}$, so that the number of pixels in the direction perpendicular to the film transport direction of one frame is 64.

As shown in FIG. 9(A), the index image buffer M1$a$ is a non-volatile memory having the storage capacity for storing the data of 512×1024 pixels, and hence the image data of 5×4×2 (=40) frames can be stored. That is, the image data representing the index image of 40 frames is stored in the index image buffer M1$a$.

The display buffer M2 has the storage capacity for storing the data of 512×1024 pixels as shown in FIG. 9(B). When the image data representing the index image is stored, the number of pixels in one frame is increased to 73×128, and the image data of 5×4 (=20) frames is stored. When the index image is displayed on the monitor TV 109, the area of 480×640 at the upper left of the display buffer M2 is read out (see FIGS. 9(B) and 9(C)).

As shown in FIG. 9(A), the image data of each frame is stored sequentially in the index image buffer M1$a$ starting from the upper left storage area to the right in such an order that the image data of each frame is captured in the scanning. If the image data of 4 frames has been stored, the image data is stored sequentially starting from the storage area one line below to the right. If the data of 5 lines (4×5=20 frames) has been stored, the image data is stored in the storage area of the next 20 frames in the same manner.

In the storage in the index image buffer M1$a$, the stored contents in the index image buffer M1$a$ are transferred to the display buffer M2.

Because the display buffer M2 can store the image data of only 20 frames at one time, the rewriting and reading of the image data to the display buffer M2 are executed such that the index image is scrolled upward, when the index image buffer M1$a$ receives the image data of the 21st frame. For example, if the image data of the 21st frame is sent to the index image buffer M1$a$, the image data in the storage area of one line from the frame number 1 to 4 in the display buffer M2 is deleted, and the image data of the 21st frame is stored, and the scanning start address in the outputting of the video signal is changed to the second line. Thereby, the monitor TV 109 displays thereon the index image, which has been scrolled upward by one line. If the image data of all frames is stored in the index image buffer M1a as described above, the screen of the monitor TV 109 is scrolled downward or switched such that the index image of the frame number 1 to 20 is displayed again on the monitor TV 109.

The CPU 160 designates the frame numbers 1, 2 . . . on each frame in such an order that the image data of each frame is captured in the scanning, and outputs a character signal representing the frame number of each frame, so that the index image on which the frame numbers are superimposed can be displayed.

Figure 7:
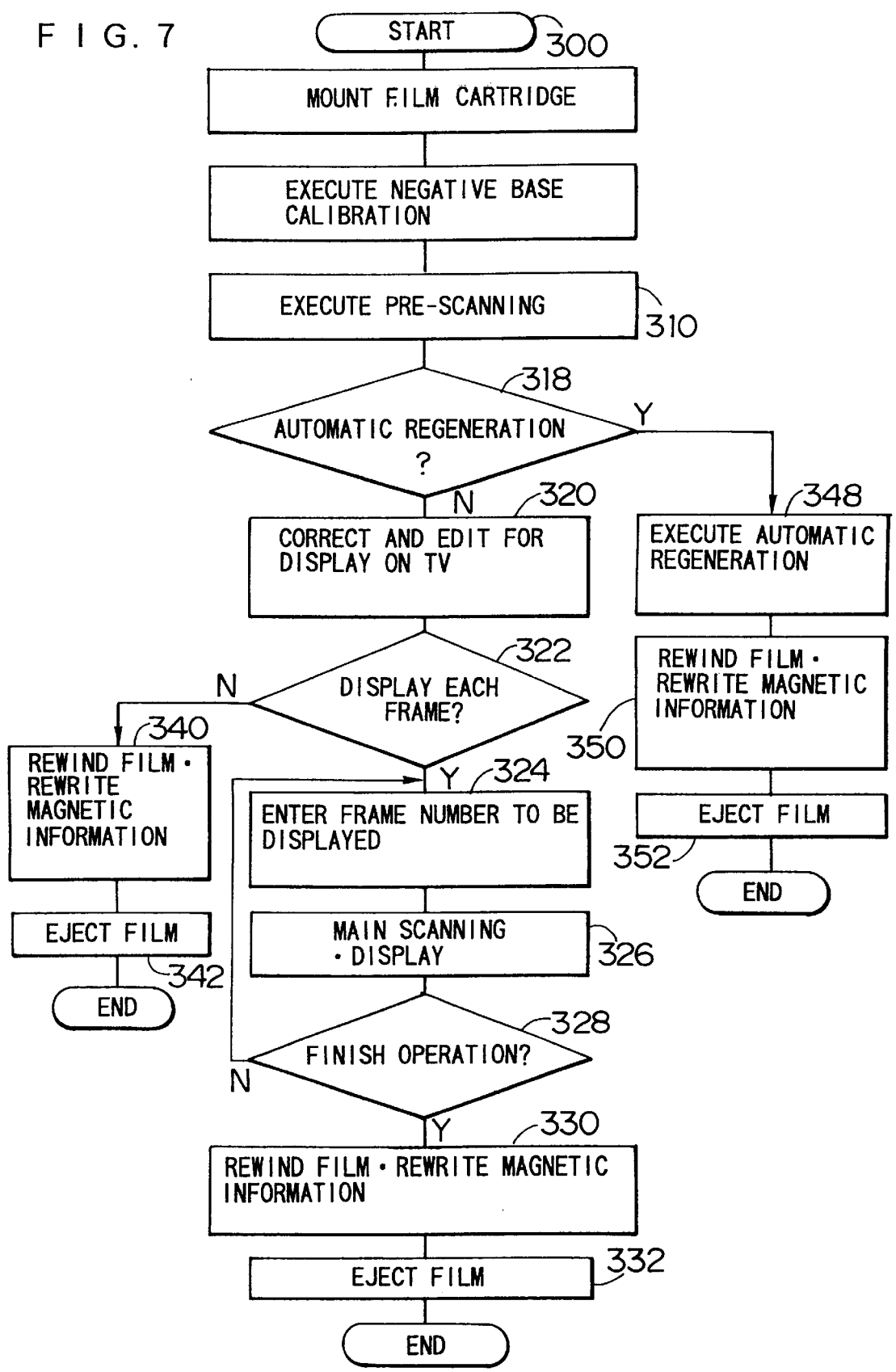
FIG. 7 is a flow chart showing the operation of the film scanner in FIG. 1.

The index image is prepared as stated above, and it is displayed on the TV monitor 109 (Step 310 in FIG. 7).

Next, it is determined whether or not the automatic regeneration is selected by the key operation, etc. (Step 318). If the automatic regeneration is not selected in Step 318, the key pad 120 is used while the index image is viewed, so as to interactively designate the information pertaining to the editing and other image regeneration processing required for displaying one frame on the TV monitor 109.

Next, an explanation will be given about the case when each frame is displayed and edited.

In this case, it is determined whether each frame is displayed or not (Step 322), and if the frame is displayed, the number of the displayed frame is entered (Step 324). Then, as shown in FIG. 8, the film 114 is transported forward at a speed of 9.25 mm/sec by one frame, and the frame of the frame number is scanned (main scanning) (Step 326). In the scanning, the image data is captured into the image data buffer M1b via the CCD line sensor 142.

In the main scanning, the information as to the brightness of the frame image to be captured is read from the RAM 160A. The exposure time of the CCD line sensor 142 is controlled according to the information such that the maximum value of the R, G and B output voltages, which are output from the analog amplifiers 146R, 146G and 146B to the A/D converter 150, can be the maximum value 2 V in which the negative base is picked up. For example, if the dynamic range of the analog amplifiers 146R, 146G and 146B is 255 (8 bit) in the digital value, and the reference maximum value of the image data read from the RAM 160A is 127 in the digital value, the exposure time of the CCD line sensor 142 is doubled (34%), and the frame image is picked up.

When the image data is captured, the CPU 160 adjusts the image data of each frame according to the AE/AWB data stored in the RAM 160A, and thereby the satisfactory image data can be captured regardless of the photographing conditions of each frame.

The number of pixels in one frame, which are captured into the image data buffer M1b in the above-mentioned manner, is 512×896 as shown in FIG. 9(D). That is, in the main scanning, the CCD output of the CCD line sensor 142 having sensors for 1024 pixels is decreased to ½, so that the number of pixels in the direction perpendicular to the film transport direction of one frame is 512. Moreover, the film transport speed is lowered to ⅛ of the speed when the image data of the index image is captured, so that the number of pixels can be 896, which is 8 times as many as the number of pixels (112 pixels) in the same direction as the film transport direction of one frame in the index image. The image data of one frame, which is captured into the image data buffer M1b in the above-mentioned manner, is transferred to the display buffer M2. The stored contents in the display buffer M2 are read repeatedly, so that the image of one frame can be displayed on the monitor TV 109. The index image buffer M1a and the image data buffer M1b are switched to each other in order to transfer the data to the display buffer M2.

In the one frame regeneration menu setting mode, the selected frame number is displayed at the upper left of the screen in the TV monitor 109, and the characters indicating the setting menu, etc. required for the editing of one frame are displayed at the right side of the screen in the monitor TV 109. In order to select the menu, the key pad 120 is used, so that the desired menu can be selected.

As shown in FIG. 8, when the editing of the displayed frame is completed (Step 328), the film 114 is transported backward at a high speed of 148.0 mm/sec. In the transporting, the magnetic data, which is read previously from the magnetic record layers 115B and 115C on the film 114, and the data representing the contents of the editing by means of the index image, the data representing the contents of the editing by means of the displayed frame, and the like are recorded again as the magnetic data onto the magnetic record layers 115B and 115C on the film 114 (Step 330), and after the rewinding, the film cartridge 110 is taken out (Step 332).

On the other hand, in Step 322, if the editing by means of the displayed frame is not executed, the process goes on to Steps 340 and 342, and the data is written onto the magnetic record layers 115B and 115C on the film 114 as is the case in Steps 330 and 332, and the film cartridge is taken out.

If the automatic regeneration is selected in Step 318, the images of plural frames on one roll of film are regenerated automatically and sequentially according to the automatic regeneration information stored in the RAM 160A (Step 348). When the automatic regeneration is completed, the magnetic data is recorded onto the magnetic record layers 115B and 115C when the film is rewound (Step 350), and the film cartridge 110 is taken out after the rewinding is over (Step 352).

In this embodiment, in view of the transporting sequence of the film, the pre-scanning is performed after the R, G and B output voltages are measured in the area A, and after the exposure is controlled, the pre-scanning is executed, and then the R, G and B output voltages are measured again in the area D; however, the present invention is not restricted to this. The R, G and B output voltages are measured in at least one of the areas A through D, and the gain or the gain and the exposure time of the line sensor is/are controlled in such a manner that the maximum value of the R, G and B output voltages can be the reference voltage. In particular, because there is a strong likelihood of the areas A and D being the negative base, the results of the calibration in the area A or D may be adopted as the calibration of the film.

FIG. 10 is a view showing the second embodiment of the present invention. In the second embodiment shown in FIG. 10, the calibration is performed twice in two areas, which are at a predetermined distance X from each other, in the area E just before the first laboratory reserved area LB1, which area has a strong likelihood of being the negative base. The same numbers are designated on the same or similar members in the previously-stated embodiment, and they will not be explained.

The film cartridge 110 is provided with an opening 110A through which Bthe film 114 is taken in and out, and the opening 110A is opened and closed by a shielding door (not shown).

The film 114, which is wound and housed in the film cartridge 110, is exposed by light which enters from the opening 110A, and thereby exposed parts 118a, 118b and 118c of the film 114 appear sometimes.

That is, the section close to the forward end of the film 114 is the outermost circumference of the winding, and this part is hence exposed to the light, and the relatively large exposed part 118a appears. The maximum width of the exposed part 118a is referred to as W. The exposed part 118B, which is smaller than the exposed part 118a, appears at a position where the film has been wound from the exposed part 118a by one turn L, due to the light transmitting through the film at the outermost circumference.

Likewise, the exposed part 118c, which is smaller than the exposed part 118b, appear at a position where the film has been wound from the exposed part 118b by one turn L.

As described above, the exposed parts 118a, 118b, 118c, appear at every turn L of the winding. The position of the exposed part 118a appearing on the film 114 at the outermost circumference cannot be fixed, and the exposed part 118a appears at a position according to the winding conditions of the film.

If the calibration is performed only once in the area E, the calibration may be performed at the exposed parts 118a, 118b, 118c, . . . . For this reason, there is a problem in that the proper results cannot be achieved. In the embodiment shown in FIG. 10, the calibration of the proper negative base is always performed whether or not there are the exposed parts 118a, 118b, and 118c.

That is, the film 114 is pulled out from the film cartridge 110, and the pulling-out of the film is stopped if the optical data reading unit 180 detects the first perforation 114A. Then, the film is rewound by a predetermined length, so that it can return to an area P1 shown in FIG. 10. The calibration (the first calibration) is executed in the area P1 in the same method as explained in the above embodiment, and then the second calibration is executed again in an area P2, which is at a distance X from the area P1.

If the distance X satisfies the following inequality (1):

$$W < X < L - W, \quad (1)$$

at least one of the areas P1 and P2 is in the area except for the exposed parts 118a, 118b and 118c, and hence the proper negative base can be measured.

The exposure time of the electronic shutter or the gain of the analog amplifiers 146R, 146G and 146B in the first calibration is compared with the exposure time of the electronic shutter or the gain of the analog amplifiers 146R, 146G and 146B in the second calibration, and the shorter exposure time or the smaller gain is adopted as the exposure time or the gain of the film.

On the other hand, as shown in FIG. 10, if the exposed part appears in the negative base area just before the first laboratory reserved area LB1 on the film 114 due to the light passing through the opening of the film cartridge, the exposed part appears in the inner layer in the winding due to the red light passing through the negative base. In this case, the undercut effect on G and B, that is, the interimage effect occurs easily.

Figure 11:
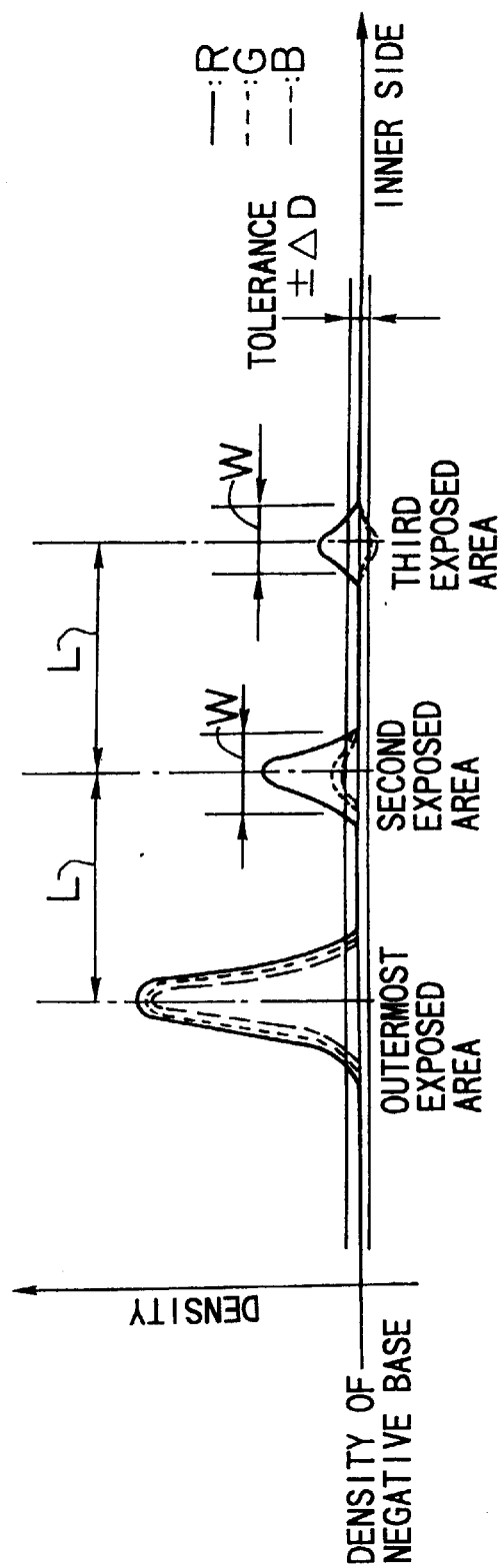
FIG. 11 is a graph showing the density of the negative base for describing the third embodiment of the present invention.

That is, because of the orange mask of the negative base, the light, which reaches the exposed area at the inner circumference (second and third turns in the film cartridge) as shown in FIG. 11, has the strong component R; on the contrary, the components G and B do not reach the exposed area. Only R hence takes color in the exposed area at the inner circumference, and G and B do not. For this reason, the interimage effect occurs, and the density of G and B is sometimes lower than the density of the original negative base (the transmission rate is high). If the negative base is detected from the density of R, G and B, there is a concern that the proper negative base cannot be detected correctly. In this case, the output of G and B appears to increase because of the interimage effect, and the calibration cannot be executed properly as a result.

In the third embodiment of the present invention, the maximum values of the R output voltages of the line sensor in plural areas are compared such that the proper negative base area can be determined. That is, the maximum values of the R output voltages in plural areas are compared in such a state that the electronic shutter and the gain of the analog amplifiers 146R, 146G and 146B are fixed, and the area having the highest R output voltage is determined to be the proper negative base area. The calibration is performed in the same method as is explained in the above-described second embodiment such that the maximum value of the R, G and B output voltages of the line sensor, which captures the proper negative base area can correspond to a predetermined reference voltage, and the gain or the gain and the exposure time in the negative base area are adopted as the gain or the gain and the exposure time of the film.

In the second embodiment, the calibration is performed first in the area P1 and then in the area P2; however, the present invention is not limited to this. The calibration may be performed first in the area P2, which is closer to the first laboratory reserved area LB1, and then in the area P1.

Next, an explanation will be given about the fourth embodiment of the present invention, in which, as shown in FIG. 12, the calibration is performed first in the area P2, which is closer to the first laboratory reserved area LB1, and then in the area P1, and if the area P2 is the proper negative base, the calibration in the area P1 can be omitted.

As shown in the flow chart of FIG. 13, the film scanner 100 is turned on to light the light source 130. After the luminous intensity of the light source 130 is stabilized (Step 401), the film cartridge I IO is set in the film scanner 100 (Step 404).

Next, the electronic shutter of the CCD line sensor 142 is set to 15% as the initial value, and the amplifier gain is set to a predetermined value (the initial value) (Step 405). Then, the film 114 is pulled out from the film cartridge 110, and when the optical data reading unit 180 detects the first perforation 114A on the film 114, the pulling-out of the film 114 is stopped (Step 406).

Then, as shown in FIG. 12, the film is rewound by a predetermined distance Y so that the predetermined area P2, which is just before the first laboratory reserved area LBI (Step 407), reaches the CCD line sensor 142.

Next, the first negative base calibration is executed in the area P2 being the proper negative base (Step 410). That is, the negative base in the area P2 is picked up by the CCD line sensor 142, and the output voltages of the CCD line sensor 142 are measured. Then, the difference between the maximum value d of the G output voltage and the reference voltage (2 V for example) is computed, and the exposure time of the electronic shutter is changed so that the maximum value d can be 2 V. As shown in FIG. 4, the gain control signal is sent from the CPU 160 to the analog amplifiers 146R and 146B, so that each maximum value of the R and B output voltages can be 2 V. Then the R output voltage (output P2) is stored (Step 411).

Next, as shown in FIG. 12, the film is rewound by the predetermined distance X shown in the above-mentioned inequality (1), so that the area P1 can move to the CCD line sensor 142 (Step 412). The negative base in the area P1 is picked up by the CCD line sensor 142, and the R output voltage (output P1) of the line sensor 142 is measured (Step 415). In this case, the electronic shutter and the gain of the analog amplifiers 146R, 146G and 146B are maintained in such a state that they are adjusted in Step 410.

Next, the output P2 stored in Step 411 is compared with the output P1 measured in Step 415 (Step 418), and if the comparison result satisfies the following inequality (2):

$$(\text{Output P2}) < (\text{Output P1}) \times \{(100-\delta)\%\}, \qquad (2)$$

where δ is a predetermined value indicating the allowable range, the area P1 is determined to be the proper negative base, and after the second negative base calibration is performed in Step 420, the process goes on to Step 310.

On the other hand, in Step 418, if the above inequality (2) is not satisfied, the second negative base calibration is omitted, and the process goes on to Step 310 shown in FIG. 7.

Actually, the area P2 is the proper negative base in most cases, and hence the calibration can be omitted in the area P1. Because the output P2 is adjusted to be the reference voltage by the first negative base calibration, the output P2 does not have to be stored in Step 411.

As shown in FIG. 12, the film 114 is provided with a record area 115D, wherein the optical information such as the bar code is recorded and which corresponds to each frame and the first laboratory reserved area LB1. The record area 115D is also provided just before the first laboratory reserved area LB1. The distance X and Y is desirably set such that the areas P1 and P2, where the negative base is captured, are positioned in the record area 115D just before the first laboratory reserved area LB1. The record area 115D has a little likelihood of being exposed, since the optical information such as the bar code is recorded in the record area 115D. Further, the area P1 is a desirable position required for reading the magnetic information (including an approach distance).

In the second and fourth embodiments, the calibration is executed in two areas P1 and P2; however, the calibration may be executed in more than two areas.

Figure 16:
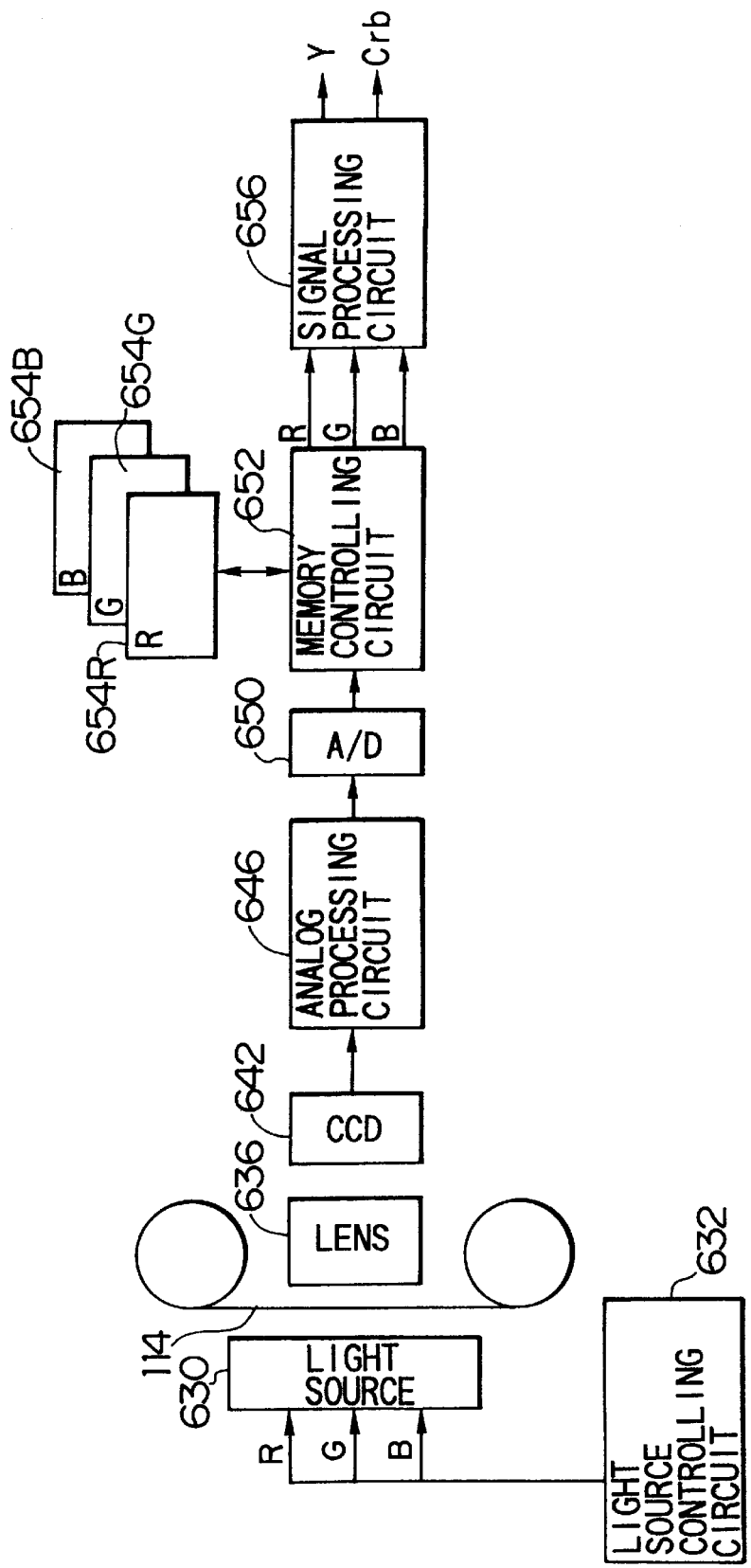
FIG. 16 is a block diagram showing essential parts of another embodiment of the inner structure of a film scanner according to the present invention.

FIG. 16 is a block diagram showing essential parts of another embodiment of the inner structure of the film scanner according to the present invention. The film scanner is different from one in FIG. 3 in that a light source 630 is composed of light-emitting diodes (LED) which emit R, G and B light, and the luminous intensity of each LED of R, G and B is controlled by a system controlling CPU (not shown) via a light source controlling circuit 632. A CCD line sensor 642 is a black-and-white line sensor.

When the R light is emitted from the light source 630 and the film 114 is illuminated, the R image light transmitting through the film 114 is formed on the light-accepting surface of the CCD line sensor 642 via a taking lens 636.

The R image light, which is formed on the light-accepting surface of the CCD line sensor 642, is charge-accumulated for a predetermined period of time in each sensor. Then the R image light is converted into the signal charge of R in accordance with the intensity of the light. The signal charge is sequentially read out as a R signal, and sent to a memory controlling circuit 652 via an analog processing circuit 646 and an A/D converter 650. The memory controlling circuit 652 stores the image data corresponding to the R image light into an image data buffer 654R. Likewise, when the G light is emitted from the light source 630, the image data corresponding to the G image light is stored into an image data buffer 654G. When the B light is emitted from the light source 630, the image data corresponding to the B image light is stored into an image data buffer 654B.

When the image data is stored in the image data buffers 654R, 654G, and 654B, the memory controlling circuit 652 reads the R, G, and B signals from the image data buffers 654R, 654G, and 654B, and sends them to a signal processing circuit 656. The signal processing circuit 656 performs the same processing as in the first signal processing circuit 151 and the second signal processing circuit 152 in FIG. 3, and generates a luminance signal Y and a chroma signal $C_{r/b}$ according to the inputted R, G, and B signals. After that, the signal processing is performed in the same manner as in the memory controlling circuit 154 and the circuits thereafter in FIG. 3. For this reason, a detailed explanation is omitted.

In the calibration in the film scanner, for example, the R light is emitted from the light source 630, and the CCD line sensor 642 picks up the negative base area A (see FIG. 2) illuminated by the R light. Then the intensity of light emitted from the LED of R in the light source 630 is controlled by the light source controlling circuit 632 such that the R output voltage output from the analog processing circuit 646 corresponds to the reference voltage (2 V for example).

Similarly, the G and B light is sequentially emitted from the light source 630, and the CCD line sensor 642 picks up the negative base area A illuminated by the G and B light. Then the intensity of light emitted from the LED of G and B in the light source 630 is controlled by the light source controlling circuit 632 such that the G and B output voltages output from the analog processing circuit 646 correspond to the reference voltage.

In all of the above-described embodiments, the film is moved at a constant speed when the frame image is captured; however, the present invention is not restricted to this. The film may be stopped, and then an image pickup means, which consists of the taking lens, the line sensor, etc., may be moved at a constant speed.

As set forth hereinabove, the method of controlling the exposure in the film scanner according to the present invention comprises the steps of capturing at least one of the negative base areas just before and just behind the first and second reserved areas having a strong likelihood of being the negative base on the film; measuring the R, G and B output voltages output from the line sensor; controlling the gain of the analog amplifiers or the gain of the analog amplifiers and the exposure time of the line sensor such that the maximum values of the obtained R, G and B output voltages corresponds to a predetermined reference value; capturing the image of each frame based on the exposure control; and thereby determining the most proper negative base on the film, of which negative base is not secured, and performing the correct exposure control.

Moreover, the method according to the present invention comprises the steps of capturing the plural areas just before and behind the first and second reserved areas; finding the gain of the analog amplifiers or the gain of the analog amplifiers and the exposure time of the line sensor such that the maximum values of the R, G and B output voltages output from each line sensor can correspond to the predetermined reference voltage; adopting as the negative base the negative base area of which the smallest gain or the shortest exposure time; and thereby determining the proper negative base on the film, of which negative base is not secured.

Further, the negative base is measured with regard to the first and fourth negative base areas having a strong likelihood of being the negative base on the film. They are compared to each other, so that the proper negative base can be determined easily. Each negative base area is captured in the film transporting sequence, and thereby the film can be transported efficiently.

Furthermore, the method of controlling the exposure in the film scanner according to the present invention comprises the steps of, measuring the negative base in the negative base area in two areas or more, which are at a predetermined distance (X) from each other, even if the exposed part appears in the negative base area just before the reserved area on the film due to the light entering through the opening of the cartridge; and thereby measuring the negative base in the proper and unexposed area at least once.

In addition, when the negative base area is determined, the R output value in each area is compared, so that the proper calibration can be performed easily without the interimage effect.

Moreover, the calibration is performed after the maximum value of the R output voltage is compared, and thereby the time required for the calibration can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A method for controlling exposure in a film scanner for scanning a developed still photographic film relative to a line sensor at a generally constant speed, said film having a first reserved area provided before a first frame and a second reserved area provided following a last frame; said method comprising the steps of:

measuring R, G and B output voltages outputted from an amplifier while capturing at least one of a first negative base area before said first reserved area, a second negative base area following said first reserved area, a third negative base area before said second reserved area, and a fourth negative base area following said second reserved area;

setting a gain level associated with an amplifier such that, at the gain level, maximum R, G and B output voltages correspond to a predetermined reference voltage where the maximum R, G, and B output voltages are established with reference to an observed reference negative base area observed to be subjected to less exposure than an image area.

2. The method of controlling the exposure in the film scanner according to claim 1, comprising steps of:

measuring, under predetermined and initialized exposure, R, G and B output voltages outputted from said amplifier while capturing plural areas of said first, second, third and fourth negative base areas;

determining a proper negative base area among said plural areas according to said R, G and B output voltages measured in said measuring step;

controlling the gain of said, amplifier, or the gain of said amplifier and the exposure time of said line sensor such that each of said maximum R, G and B output voltages, obtained from evaluating said proper negative base area, corresponds to said predetermined reference voltage; and capturing an image of at least one of said frames.

3. The method of controlling the exposure in the film scanner according to claim 2, comprising the steps of:

comparing maximum values of R output voltages in said plural areas;

controlling the gain of said, amplifier or the gain of said amplifier and the exposure time of said line sensor such that each of maximum R, G and B output voltages, obtained from evaluating an area having the largest maximum value of R output voltage, corresponds to said predetermined reference voltage.

4. The method of controlling the exposure in the film scanner according to claim 1, comprising the steps of:

capturing plural areas of said first, second, third and fourth negative base areas;

in each of said plural areas, controlling the gain of said amplifier such that each maximum value R, G and B output voltages outputted from said amplifier corresponds to said predetermined reference voltage, and storing the gain of said amplifier;

adopting the smallest value of the stored gain as a proper gain for said film;

controlling the gain of said amplifier such that said gain is generally equal to said proper gain; and capturing an image of at least one of said frames.

5. The method of controlling the exposure in the film scanner according to claim 1, comprising the steps of:

capturing plural areas of said first, second, third and fourth negative base areas;

in each of said plural areas, controlling the gain of said amplifier and the exposure time of said line sensor such that each maximum value of R, G and B output voltages output from said amplifier corresponds to said predetermined reference voltage, and storing the gain of said amplifier and the exposure time of said line sensor;

adopting the smallest value of the stored gain and the shortest time of the stored exposure time as proper gain and exposure time for said film;

controlling the gain of said amplifier and the exposure time of said line sensor such that said gain and said exposure time are generally equal to said proper gain and exposure time; and capturing an image of each frame of the photographic film.

6. The method of controlling the exposure in the film scanner according to claim 4, comprising the steps of:

comparing said gain of R channel of said analog amplifier for said plural areas; and adopting, as proper gain for said film, the gain of said amplifier which gain is stored when an area having the smallest gain of R channel of said analog amplifier is captured.

7. The method of controlling the exposure in the film scanner according to claim 5, comprising the steps of:

comparing said gain of R channel of said amplifier for said plural areas; and adopting, as proper gain and exposure time for said film, the gain of said amplifier and the exposure time of said line sensor which gain and time are stored when an area having the smallest gain of R channel of said amplifier is captured.

8. The method of controlling the exposure in the film scanner according to claim 1, comprising the steps of:

measuring, under predetermined and initialized exposure, first R, G and B output voltages output from said amplifier while capturing said first negative base area, and storing said first R, G and B output voltages;

controlling the gain of said amplifier such that each maximum value of said first R, G and B output voltages corresponds to said predetermined reference voltage;

capturing an image of each frame;

measuring, under said predetermined exposure which his initialized again, fourth R, G and B output voltages output from said amplifier while capturing said fourth negative base area;

controlling the gain of said amplifier such that each maximum value of said fourth R, G and B output voltages corresponds to said predetermined reference voltage, if said fourth R, G and B output voltages are higher than said stored R, G and B output voltages; and capturing an image of at least one of said frames.

9. The method of controlling the exposure in the film scanner according to claim 1, comprising the steps of:

measuring, under predetermined and initialized exposure, first R, G and B output voltages output from said amplifier while capturing said first negative base area, and storing said first R, G and B output voltages;

controlling the gain of said amplifier and the exposure time of said line sensor such that each maximum value of said first R, G and B output voltages corresponds to said predetermined reference voltage;

capturing an image of each frame;

measuring, under said predetermined exposure which is initialized again, fourth R, G and B output voltages output from said amplifier while capturing said fourth negative base area;

controlling the gain of said amplifier and the exposure time of said line sensor such that each maximum value of said fourth R, G and B output voltages corresponds to said predetermined reference voltage, if said fourth R, G and B output voltages are higher than said stored first R, G and B output voltages; and capturing an image of each frame.

10. The method of controlling the exposure in the film scanner according to claim 8, comprising the steps of:

controlling the gain of said amplifier such that each maximum value of said fourth R, G and B output voltages corresponds to said predetermined reference voltage, if said maximum value of said fourth R, G and B output voltage is higher than a maximum value of said stored first R output voltage.

11. The method of controlling the exposure in the film scanner according to claim 9, comprising the steps of:

controlling the gain of said amplifier and the exposure time of said line sensor such that each maximum value of said fourth R, G and B output voltages corresponds to said predetermined reference voltage, if said maximum value of said fourth R output voltage is higher than a maximum value of said stored first R output voltage.

12. A method of controlling exposure in a film scanner for a developed continuous still photographic film mounted in a film cartridge and said film scanner capturing a frame image on said film by a line sensor, and R, G and B output voltages of said line sensor being amplified by an amplifier; said method comprising the steps of:

in a negative base area before a reserved area provided before a first frame on said film, said reserved area being reserved for a processing laboratory, measuring R, G and B output voltages output from said amplifier while capturing, under predetermined and initialized exposure, a negative base located before a reserved area preceding a first frame of the film, the negative base situated in two areas or more which are at a distance (X) from each other, said distance X satisfying the following inequality:

W<X<L-W, where W is the maximum width of a part on said film in the longitudinal direction of said film, said part being exposed by light entering said cartridge through an opening in said cartridge, and where L is a length in which said film close to said negative base area is wound around a rotatable member by an incremental rotational advancement;

determining an area having the largest value of the measured R, G and B output voltages as a proper negative base area subjected to less exposure than an image area;

controlling gain of said amplifier or gain of said amplifier and an exposure time of said line sensor such that each maximum value of said R, G and B output voltages obtained from evaluating the determined proper negative base area, corresponds to a predetermined reference voltage; and capturing an image at least one frame of the film.

13. The method of controlling the exposure in the film scanner according to claim 12, comprising the steps of:

comparing maximum values of R output voltages in said areas;

controlling the gain of said amplifier or the gain of said amplifier and the exposure time of said line sensor such that each maximum value of R, G and B output voltages output from said amplifier when capturing an area having the largest maximum value of R output voltage corresponds to said predetermined reference voltage.

14. A method of controlling exposure in a film scanner for a developed continuous still photographic film mounted in a film cartridge and said film scanner capturing a frame image on said film by a line sensor, and R, G and B output voltages of said line sensor being amplified by an amplifier, said method comprising the steps of:

capturing a first area in a negative base area anticipated to be less exposed than an image area, before a reserved area preceding a first frame on said film, said reserved area being reserved for a processing laboratory;

executing a first calibration in which a gain of said amplifier, or the gain of said amplifier and an exposure time of said line sensor are controlled such that each captured maximum value of R, G and B output voltages, derived from the capturing of the first area, corresponds to a predetermined reference voltage;

capturing a second area at a distance (X) from said first area in a longitudinal direction of the film to select one of said first area and said second area as an observed negative base area, said distance X satisfying the following inequality:

W<X<L-W, where W is a maximum width of an exposed part on said film in the longitudinal direction of said film, said part being exposed by light entering said cartridge through an opening in said cartridge, and L is a length in which said film close to said first area is wound around a rotatable member, within the cartridge, by an incremental rotational advancement;

executing, if each captured maximum value of R, G, and B output voltages, derived from capturing the second area and outputted from said amplifier, is higher than said predetermined reference voltage, a second calibration in which the gain of said amplifier or the gain of said amplifier and the exposure time of said line sensor are controlled such that each captured maximum value of R, G and B output voltages, derived from capturing the second area and outputted from said amplifier corresponds to said predetermined reference voltage; and capturing an image of at least one frame of the film.

15. The method of controlling the exposure of the film scanner according to claim 14, comprising the steps of:

determining whether to use the first calibration or the second calibration based upon an R output voltage as a highest observed value.

16. The method of controlling the exposure in the film scanner according to claim 14, wherein said first and second areas, which are at said distance (X) from each other, are in a recording area in which optical information in a bar code format is recorded on said film.

17. The method of controlling the exposure in the film scanner according to claim 14, further comprising the step of, before executing said first calibration, adjusting the gain of said amplifier and the exposure time of said line sensor so that R, G and B output voltages output from said amplifier when said line sensor captures a typical negative base can be such a predetermined reference voltage that said R, G and B output voltages are approximately or generally equal and are not saturated.

18. A method of controlling exposure in a film scanner for a developed continuous still photographic film mounted in a film cartridge and said film scanner capturing a frame image on said film by a line sensor, and R, G and B output voltages of said line sensor being amplified by an amplifier said method comprising the steps of:

initializing gain of said amplifier and an exposure time of said line sensor so that amplified R, G and B output voltages, obtained when said line sensor captures a typical negative base, correspond to a predetermined reference voltage and so that said R, G and B output voltages are approximately or generally equal and unsaturated;

capturing a negative base area, anticipated to be less exposed than an image area, before a reserved area provided before a first frame on said film, said reserved area being reserved for a processing laboratory;

controlling the gain of said amplifier and the exposure time of said line sensor such that each maximum value of said R, G and B output voltages corresponds to said predetermined reference voltage; and capturing an image of each frame.

19. The method of controlling the exposure in the film scanner according to claim 18, further comprising the steps of:

using a film cartridge in which identifying information for a film type is recorded in at least one of said film cartridge and said film, and storing, in memory, the gain of said amplifier and the exposure time of said line sensor to be initialized according to the film type;

determining a film type of said film by reading said identifying information;

reading, from said memory the gain of said amplifier and the exposure time of said line sensor for the determined film type, and initializing the gain of said amplifier and the exposure time of said line sensor based upon the read gain of said amplifier and the read exposure time of said line sensor;

initializing the gain of said amplifier and the exposure time of said line sensor based upon the gain of said amplifier and the exposure time of said line sensor for said typical negative base, if the gain of said amplifier and the exposure film of said line sensor for said determined film type are not stored in said memory.

20. A method of controlling exposure in a film scanner for scanning a developed still photographic film relative to a line sensor, said film having a first reserved area before a first frame and a second reserved area following a last frame, said areas being reserved for a processing laboratory, and said film scanner sequentially illuminating frame images on said film by light emitting means which emits R, G, and B light and picks up light transmitted through said film by said line sensor, and R, G and B output voltages of said line sensor are amplified by amplifier; said method comprising the steps of:

capturing by said line sensor, at least one negative base area, subjected to less exposure than an image area, of an area before said first reserved area and an area following said second reserved area;

controlling the intensity of R, G, and B light emitted from said light emitting means such that each maximum value of R, G, and B output voltages, derived from the capturing of the at least one negative base area corresponds to a predetermined reference voltage; and capturing an image of each frame.

21. A method of controlling exposure in a scanner for scanning photographic film, the method comprising the steps of:

establishing an initial exposure time and an initial voltage maximum for a primary color associated with an image sensor for scanning the photographic film;

measuring an output voltage of the primary color during capturing of candidate negative base areas of the photographic film using the initial exposure time and the initial voltage maximum established;

adjusting a maximum gain or gain profile of an amplifier for a maximum output voltage of the primary color to correspond to a predetermined reference voltage where the maximum output voltage is determined with reference to an observed reference negative base area observed to be subjected to less exposure than an image area, to prepare for scanning of the photographic film.

22. The method according to claim 21 further comprising the step of:

determining a reference negative base area from the candidate negative base areas by comparing the measured output voltages associated with the candidate base areas, and selecting one of the candidate base areas having the largest measured output voltage as the reference negative base area subjected to less exposure than an image area of the photographic film.

23. The method according to claim 21 wherein the adjusting step comprises setting the maximum gain prior to a main scanning of the photographic film.

24. The method according to claim 21 wherein the primary color comprises red to avoid an inter-image effect during the scanning of the photographic film.

25. The method according to claim 21 wherein the primary color is selected from the group consisting of red, green, and blue.

26. The method according to claim 21 wherein the measuring step comprises taking measurements in two areas separated by a predetermined distance to avoid measurement of an exposed negative base.

27. The method according to claim 21 wherein the measuring step includes designating candidate negative base areas on the photographic film including a first candidate negative base area preceding a first frame and associated with a first laboratory reserved area a second candidate negative base area following a last frame and associated with a second laboratory reserved area.

28. The method according to claim 21 wherein the step of establishing the initial exposure time and the initial voltage includes reading film type data recorded on the film and accessing records on the initial exposure time and the initial voltage based upon the film type data, the records being stored in the scanner.

29. The method according to claim 21 wherein the step of establishing the initial exposure time and the initial voltage includes accessing an initial gain for the amplifier stored in the scanner, the initial gain based upon a typical film within a film type classification.

30. A system for controlling exposure in a scanner for scanning photographic film having candidate negative base areas subjected to less exposure than an image area of the photographic film, the system comprising:

an image sensor for scanning the photographic film, the image sensor having an initial exposure time and an initial voltage maximum for a primary color signal associated with the image sensor;

measuring means for measuring an output voltage of the primary color signal during capturing of the candidate negative base areas of the photographic film using the initial exposure time and the initial voltage maximum;

an amplifier having a gain adjusted for a maximum output voltage of the primary color signal corresponding to a predetermined reference voltage where the maximum output voltage is determined with reference to an observed reference negative base area observed to be subjected to less exposure than an image area, to prepare for scanning of the photographic film.

31. The system according to claim 30 wherein the primary color signal comprises a red signal to avoid an inter-image effect during the scanning of the photographic film.

32. The system according to claim 30 wherein the primary color signal is selected from the group consisting of a red signal, a green signal, and blue signal.

33. The system according to claim 30 wherein the measuring means is adapted to take measurements in two areas separated by a predetermined distance to avoid measurement of an exposed negative base.

34. The system according to claim 30 further comprising:

a selector for selecting a reference negative base area from the candidate negative base areas by selecting one of the candidate base areas having the largest measured output voltage as the reference negative base area.

35. The system according to claim 34 wherein the selector is adapted to select the reference negative base area from a first candidate negative base area preceding a first frame and associated with a first laboratory reserved area, and a second candidate negative base area following a last frame and associated with a second laboratory reserved area.

36. The system according to claim 30 further comprising:

a storage medium associated with the scanner;

a reader for reading film type data recorded on the photographic film and accessing records in the storage medium on the initial exposure time and the initial voltage based upon the film type data.

37. The method according to claim 30 further comprising:

a storage medium for storing the initial exposure time and the initial voltage gain for the amplifier, the initial voltage gain based upon a typical film within a film type classification.

* * * * *